US010984004B2

(12) United States Patent
Merg et al.

(10) Patent No.: US 10,984,004 B2
(45) Date of Patent: Apr. 20, 2021

(54) SYSTEMS AND METHODS FOR PREDICTIVE AUGMENTATION OF VEHICLE SERVICE PROCEDURES

(71) Applicant: Snap-on Incorporated, Kenosha, WI (US)

(72) Inventors: Patrick S. Merg, Hollister, CA (US); Jacob G. Foreman, Hollister, CA (US); Todd Mercer, Descanso, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 16/244,679

(22) Filed: Jan. 10, 2019

(65) Prior Publication Data

US 2019/0146973 A1    May 16, 2019

Related U.S. Application Data

(63) Continuation of application No. 14/812,941, filed on Jul. 29, 2015, now Pat. No. 10,216,796.

(51) Int. Cl.
*G01M 17/00* (2006.01)
*G07C 5/08* (2006.01)
(Continued)

(52) U.S. Cl.
CPC ...... *G06F 16/24575* (2019.01); *G06F 16/248* (2019.01); *G06F 16/738* (2019.01);
(Continued)

(58) Field of Classification Search
CPC .... G07C 5/008; G07C 5/0808; G07C 5/0816; G07C 5/0841; G06Q 10/06; G06Q 10/20; G01M 17/00; G01R 31/005; G06F 17/30
(Continued)

(56) References Cited

U.S. PATENT DOCUMENTS 6,263,322 B1   7/2001  Kirkevold et al.
6,650,516 B2   5/2003  Baird et al.
(Continued)

FOREIGN PATENT DOCUMENTS

WO   02/17118 A1      2/2002
WO   2004092918 A1   10/2004
(Continued)

OTHER PUBLICATIONS

A Capacitated Vehicle Routing Problem With Synchronized Pick-Ups and Drop-Offs: The Case of Medication Delivery and Supervision in the DR Congo; John Clarke;Viviane Gascon;Jacques A. Ferland; IEEE Transactions on Engineering Management; vol. 64, Issue: 3; IEEE Journal Article. (Year: 2017).*

(Continued)

*Primary Examiner* — Cuong H Nguyen
(74) *Attorney, Agent, or Firm* — McDonnell Boehnen Hulbert & Berghoff LLP

(57) ABSTRACT

An example method includes receiving a first service procedure including a plurality of procedural steps for servicing a vehicle, identifying at least one procedural step of the plurality of procedural steps to supplement with supplemental service information, receiving information about vehicles sharing one or more attributes with the vehicle, determining at least one piece of supplemental service information to supplement the at least one identified procedural step, and providing a supplemented service procedure comprising the first service procedure with the at least one piece of supplemental service information included with the at least one identified procedural step.

20 Claims, 11 Drawing Sheets

(51) Int. Cl.
| | |
|---|---|
| *G06F 16/2457* | (2019.01) |
| *G06F 16/248* | (2019.01) |
| *G06F 16/738* | (2019.01) |
| *G06F 16/783* | (2019.01) |
| *G06Q 10/06* | (2012.01) |
| *G06Q 10/00* | (2012.01) |
| *G07C 5/00* | (2006.01) |

(52) U.S. Cl.
CPC ............ *G06F 16/783* (2019.01); *G06Q 10/06* (2013.01); *G06Q 10/20* (2013.01); *G07C 5/008* (2013.01); *G07C 5/0808* (2013.01)

(58) Field of Classification Search
USPC .... 701/31, 31.4, 29.4, 29.6; 340/7.29, 12.25
See application file for complete search history.

(56) References Cited

U.S. PATENT DOCUMENTS

| | | |
|---|---|---|
| 6,615,120 B1 | 9/2003 | Rother |
| 6,714,846 B2 | 3/2004 | Trsar et al. |
| 6,768,935 B1 | 7/2004 | Morgan et al. |
| 6,845,307 B2 | 1/2005 | Rother |
| 6,859,699 B2 | 2/2005 | Carroll et al. |
| 7,117,194 B2 | 10/2006 | Costantino et al. |
| 7,142,960 B2 | 11/2006 | Grier et al. |
| 7,209,815 B2 | 4/2007 | Grier et al. |
| 7,209,860 B2 | 4/2007 | Trsar et al. |
| 7,363,129 B1 | 4/2008 | Barnicle et al. |
| 7,373,225 B1 | 5/2008 | Grier et al. |
| 7,373,226 B1 | 5/2008 | Cancilla et al. |
| 7,551,993 B1 | 6/2009 | Cancilla et al. |
| 7,555,376 B2 | 6/2009 | Beronja |
| 7,698,104 B2 | 4/2010 | Cousin et al. |
| 7,739,007 B2 | 6/2010 | Logsdon |
| 7,957,860 B2 | 6/2011 | Grier et al. |
| 8,005,853 B2 | 8/2011 | Cancilla et al. |
| 8,019,503 B2 | 9/2011 | Andreasen et al. |
| 8,024,083 B2 | 9/2011 | Chenn |
| 8,068,951 B2 | 11/2011 | Chen et al. |
| 8,190,749 B1 | 5/2012 | Chi |
| 8,630,765 B2 | 1/2014 | Chen |
| 8,825,271 B2 | 9/2014 | Chen et al. |
| 8,977,423 B2 | 3/2015 | Merg et al. |
| 9,014,908 B2 | 4/2015 | Chen et al. |
| 9,117,319 B2 | 8/2015 | Chen et al. |
| 9,142,066 B2 | 9/2015 | Chen et al. |
| 2002/0007237 A1* | 1/2002 | Phung ................ G05B 23/0216 701/31.4 |
| 2002/0138185 A1 | 9/2002 | Trsar et al. |
| 2002/0184178 A1 | 12/2002 | Tasooji |
| 2003/0004624 A1 | 1/2003 | Wilson et al. |
| 2003/0195681 A1 | 10/2003 | Rother |
| 2004/0176885 A1 | 9/2004 | Quinn |
| 2005/0015186 A1 | 1/2005 | Kelly |
| 2005/0085964 A1 | 4/2005 | Knapp et al. |
| 2005/0272478 A1 | 12/2005 | Larson et al. |
| 2006/0106797 A1 | 5/2006 | Srinivasa et al. |
| 2007/0043487 A1 | 2/2007 | Krzystofczyk et al. |
| 2008/0004764 A1 | 1/2008 | Chinnadurai et al. |
| 2008/0183351 A1 | 7/2008 | Grier et al. |
| 2009/0062977 A1 | 3/2009 | Brighenti |
| 2009/0295559 A1 | 12/2009 | Howell et al. |
| 2010/0063668 A1 | 3/2010 | Zhang et al. |
| 2010/0179844 A1 | 7/2010 | Laferfola |
| 2011/0035094 A1* | 2/2011 | Van Den Berg ... G05B 23/0251 701/31.4 |
| 2011/0118905 A1 | 5/2011 | Mylaraswamy et al. |
| 2011/0172874 A1 | 7/2011 | Patnaik et al. |
| 2011/0218703 A1 | 9/2011 | Uchida |
| 2011/0238258 A1 | 9/2011 | Singh et al. |
| 2012/0040612 A1 | 2/2012 | Lee et al. |
| 2012/0245791 A1 | 9/2012 | Yun et al. |
| 2012/0303205 A1 | 11/2012 | Subramania |
| 2013/0223684 A1 | 8/2013 | Townsend et al. |
| 2013/0304306 A1 | 11/2013 | Selkirk et al. |
| 2014/0075356 A1 | 3/2014 | Gray et al. |
| 2014/0121888 A1 | 5/2014 | Guo et al. |
| 2014/0207771 A1 | 7/2014 | Merg |
| 2014/0277908 A1 | 9/2014 | Fish et al. |
| 2015/0006018 A1* | 1/2015 | Tesanovic ............ G07C 5/0808 701/29.6 |
| 2015/0066781 A1* | 3/2015 | Johnson ................ B60W 30/00 705/305 |
| 2015/0142255 A1 | 5/2015 | Gormley |
| 2015/0371455 A1* | 12/2015 | Abdel-Rahman ...... G06Q 10/20 701/29.1 |
| 2016/0148446 A1* | 5/2016 | Corriere ................ G07C 5/008 701/29.1 |
| 2016/0314627 A1* | 10/2016 | Fish .................... H04L 65/1069 |
| 2017/0031997 A1 | 2/2017 | Merg |
| 2017/0173262 A1 | 6/2017 | Veltz |
| 2017/0372532 A1 | 12/2017 | Merg et al. |
| 2017/0372533 A1 | 12/2017 | Merg et al. |
| 2018/0005199 A1 | 1/2018 | Abuelsaad |

FOREIGN PATENT DOCUMENTS

| | | |
|---|---|---|
| WO | 2013063232 A1 | 5/2013 |
| WO | 2014001799 A1 | 1/2014 |
| WO | WO2017019693 A1 | 2/2017 |

OTHER PUBLICATIONS

A mobile system for emergency health care provision via telematics support—"AMBULANCE" S. Pavlopoulos;E. Kyriacou;A. Berler;D. Koutsouris; Proceedings. 1998 IEEE International Conference on Information Technology Applications in Biomedicine, ITAB '98 (Cat. No. 98EX; IEEE Conference Paper. (Year: 1998).*
Inspection, Identification and Repair Monitoring of Cracked Concrete structure—An application of Image processing R. K. Meghana et al.; 2018 3rd International Conference on Communication and Electronics Systems (ICCES); IEEE Conference Paper. (year: 2018).*
A scalable solution for integrating illustrated parts drawings into a Class IV Interactive Electronic Technical Manual M.L. Boose;D.B. Shema;L.S. Baum; Seventh International Conference on Document Analysis and Recognition, 2003. Proceedings; IEEE Conference Paper. (Year: 2003).*
Muller, Tobias Carsten; et al.; A Heuristic Approach for Oftboard-Diagnostics in Advanced Automotive Systems; Apr. 20, 2009; 9 pages; SAE World Congress 2009, Detroit, MI, USA; SAE Document No. 2009-01-1027.
Jain, Anil K.; Mao, Jianchang; Mohiuddin, K.M; Artificial Neural Networks: A Tutorial; Mar. 1996; 14 pages; IEEE.
Jain, A.K.; Murty, M.N.; Flynn, P.J.; Data Clustering: A Review; Sep. 1999; 60 pages; ACM Computing Surveys, vol. 31, No. 3.
PCT Written Opinion of the International Searching Authority, International PCT application No. PCT/US2016/044057, pp. 5.
International Search Report, PCT application No. PCT/US2016/044057, dated Jul. 26, 2016, pp. 5.

* cited by examiner

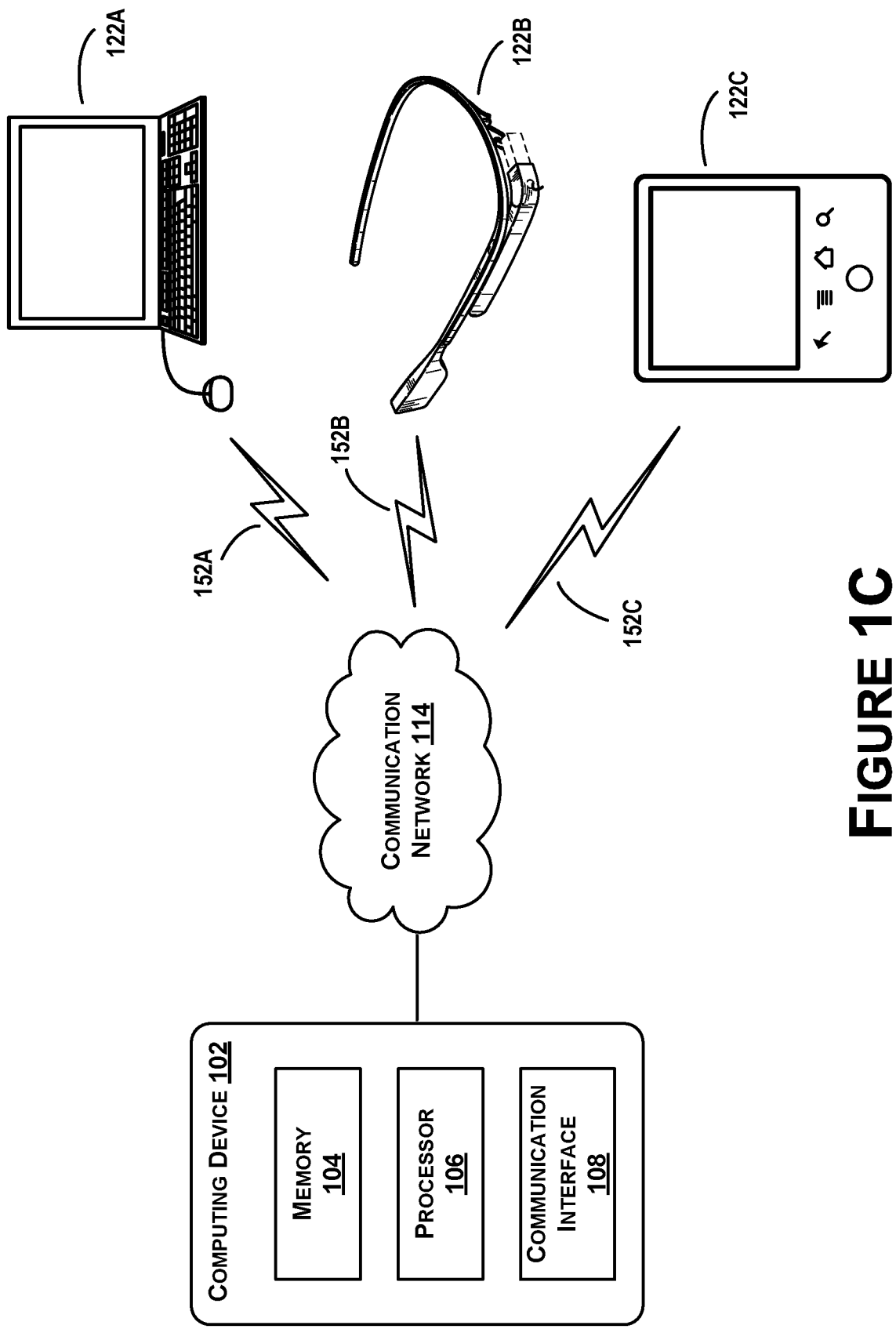

SYSTEMS AND METHODS FOR PREDICTIVE AUGMENTATION OF VEHICLE SERVICE PROCEDURES

CROSS-REFERENCE TO RELATED APPLICATIONS

This application is a continuation of U.S. patent application Ser. No. 14/812,941, entitled "Systems and Methods for Predictive Augmentation of Vehicle Service Procedures", filed Jul. 29, 2015, the contents of which are fully incorporated herein for all purposes.

BACKGROUND

Various types of vehicles produced by manufacturers occasionally have to be repaired. In some cases, a vehicle owner may notice a change in the performance of a vehicle, prompting the vehicle owner to bring the vehicle to a repair shop to diagnose a problem and potentially repair the vehicle. In other cases, an electronic control module of the vehicle may detect a fault and provide a malfunction indication via an instrument panel of the vehicle. If the vehicle owner notices the indication, the vehicle owner may bring the vehicle to a repair shop for service. Based on symptoms reported by the vehicle owner and/or automated error indicators such as diagnostic codes, a repair shop employee may identify one or more service procedures to perform on the vehicle in order to repair the vehicle. For instance, a service procedure may be followed by a mechanic at the repair shop to replace the vehicle's brake pads, fix a leaking tire, or service a vehicle's air conditioning system. In some examples, a service procedure stored in a digital format may be accessed by a mechanic at a repair shop with a computing device, such as a laptop computer, a touchpad, or a head-mounted display (HMD). The mechanic may then view steps of the procedure on a display of the computing device while performing those steps on the vehicle.

SUMMARY

In one example aspect, a method is provided that includes receiving, at a computing device from a first data source that includes computer-readable service procedures, a first service procedure including a plurality of procedural steps for servicing a vehicle. The method further includes identifying, at the computing device, at least one procedural step of the plurality of procedural steps to supplement with supplemental service information. The method also includes receiving, at the computing device from a second data source that includes computer-readable vehicle information, information about vehicles sharing one or more attributes with the vehicle. The method additionally includes determining, at the computing device based on the received information, at least one piece of supplemental service information to supplement the at least one identified procedural step. The method further includes providing, by the computing device for presentation on a display, a supplemented service procedure comprising the first service procedure with the at least one piece of supplemental service information included with the at least one identified procedural step.

In another example aspect, a non-transitory computer-readable medium is provided having stored therein instructions, that when executed by a computing device, cause the computing device to perform functions. The functions include receiving, from a first data source that includes computer-readable service procedures, a first service procedure including a plurality of procedural steps for servicing a vehicle. The functions further include identifying, at least one procedural step of the plurality of procedural steps to supplement with supplemental service information. The functions also include receiving, from a second data source that includes computer-readable vehicle information, information about vehicles sharing one or more attributes with the vehicle. The functions additionally include determining, based on the received information, at least one piece of supplemental service information to supplement the at least one identified procedural step. The functions further include providing, for presentation on a display, a supplemented service procedure comprising the first service procedure with the at least one piece of supplemental service information included with the at least one identified procedural step.

In a further example aspect, a system is provided that includes one or more processors, and a non-transitory computer-readable data storage device storing computer-readable program instructions. The computer-readable program instructions are executable by the one or more processors to receive, from a first data source that includes computer-readable service procedures, a first service procedure including a plurality of procedural steps for servicing a vehicle. The computer-readable program instructions are further executable by the one or more processors to identify, at least one procedural step of the plurality of procedural steps to supplement with supplemental service information. The computer-readable program instructions are additionally executable by the one or more processors to receive, from a second data source that includes computer-readable vehicle information, information about vehicles sharing one or more attributes with the vehicle. The computer-readable program instructions are also executable by the one or more processors to determine, based on the received information, at least one piece of supplemental service information to supplement the at least one identified procedural step. The computer-readable program instructions are further executable by the one or more processors to provide, for presentation on a display, a supplemented service procedure comprising the first service procedure with the at least one piece of supplemental service information included with the at least one identified procedural step.

In still another aspect, a system is provided that includes means for receiving, at a computing device from a first data source that includes computer-readable service procedures, a first service procedure including a plurality of procedural steps for servicing a vehicle. The system further includes means for identifying, at the computing device, at least one procedural step of the plurality of procedural steps to supplement with supplemental service information. The system also includes means for receiving, at the computing device from a second data source that includes computer-readable vehicle information, information about vehicles sharing one or more attributes with the vehicle. The system additionally includes means for determining, at the computing device based on the received information, at least one piece of supplemental service information to supplement the at least one identified procedural step. The system further includes means for providing, by the computing device for presentation on a display, a supplemented service procedure comprising the first service procedure with the at least one piece of supplemental service information included with the at least one identified procedural step.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 1A, 1B, and 1C illustrate example system components, according to an example embodiment.

DETAILED DESCRIPTION

Figure 1A:
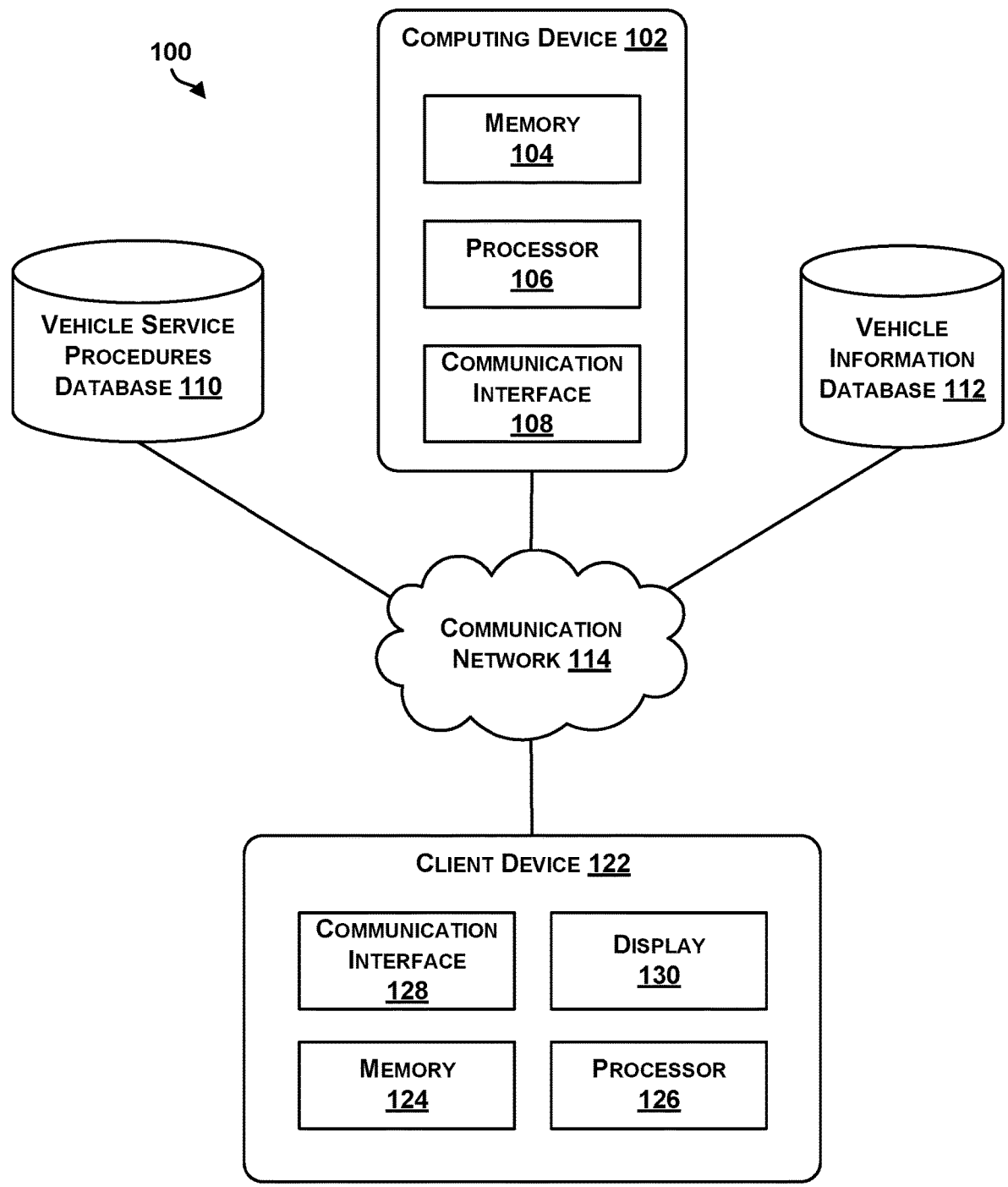

The following detailed description describes various features and functions of the disclosed systems and methods with reference to the accompanying figures. In the figures, similar reference numbers identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The example embodiments are applicable to a variety of repairable items, such as a vehicle or some other type of repairable machine or device. For purposes of this description, a vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed, or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Within examples, methods and devices are described for providing a supplemented vehicle service procedure (e.g., for use by a technician at a repair shop). More specifically, a computing device may receive a particular vehicle service procedure that includes a number of steps to be performed on a vehicle in order to complete the procedure. Vehicle service procedures may be received in a digital format from a variety of different sources. For instance, the service procedure may be an original equipment manufacturer (OEM) procedure for a particular type of vehicle or vehicle component. The computing device may identify certain steps of the vehicle service procedure to augment with supplemental information. More specifically, the supplemental information may be information predicted to assist a technician during performance of the service procedure. Additionally, the supplemental information may be displayed to the mechanic (e.g., on a handheld device or a wearable portable device such as an HMD or a wrist display) at chosen points during performance of the procedure or particular procedural steps.

In some examples, a service procedure for a particular vehicle may be identified by a computing device based on vehicle symptom information reported by a vehicle owner and/or an automated system of the vehicle. For instance, the symptom information could be "engine hesitates on takeoff" or "engine is overheating." In other examples, the symptom information could include one or more diagnostic trouble codes (DTCs). A DTC may be a generic or manufacturer-specific code that is used to identify vehicle problems, such as "Throttle/Petal Position Sensor/Switch Malfunction" or "Transmission Control System Malfunction." In further examples, the symptom information can include an indication that a malfunction indicator lamp of the vehicle is illuminated. A service procedure may be selected by a computing device to be performed by a technician in order address identified symptoms. In other examples, a particular service procedure may be manually selected by the technician instead. For instance, a technician may request a particular service procedure (e.g., "Replace Brake Pads") for a particular type of vehicle (e.g., a 2003 Toyota Corolla).

Once a service procedure is received, supplemental vehicle information for the service procedure may be obtained from a different data source than the data source which provided the service procedure. In one embodiment, a service procedure may be supplemented by a server in communication via a communication network with both a vehicle service procedures database and a separate supplemental vehicle information database. The server may determine which steps of a procedure from the vehicle service procedures database to supplement, and with which particular pieces of information from the vehicle information database.

The vehicle information database may contain information about vehicles that share one or more attributes with the vehicle being serviced. For instance, the vehicle information database may include technical specifications about vehicles with particular attributes, such as a particular year, make, model, and engine type (YMME). In other examples, the particular attributes may include a particular year, make, and model (YMM), or a particular year, make, model, engine type, and system (YMMES). In further examples, the vehicle information database can include trend data gathered from one or more repair shops regarding past repairs performed on vehicles that share one or more common attributes with a given vehicle. The attributes can also include other types of information that differentiates different models or types of vehicles, such as regular production option (RPO) codes that refer to a specific option or modification to a vehicle. For example, the vehicle attributes may indicate that a vehicle includes a trailer hauling package or various other components that a vehicle can be manufactured or equipped with. In additional examples, the vehicle attributes may also include vehicle usage information, such as ranges of vehicle mileage or geographical location.

In some examples, supplemental service information may include one or more metrics associated with a particular vehicle component or system involved in one or more procedural steps. For instance, a computing device may identify that a particular step of a procedure involves adding a fluid to a vehicle component or system. The computing device may further determine that the step of the service procedure lacks certain information about the component or system that would be useful for a technician performing the step, such as a fluid capacity and/or fluid specifications (e.g., indicating a type of fluid to use such as type F transmission fluid or Textron transmission fluid). This additional information may be pulled from a separate data source and then added to the procedural step as part of a supplemented service procedure that is displayed to a technician performing the procedure.

In additional examples, supplemental service information may include other types of information related to particular vehicle components or systems. For example, a computing device may identify a step of a procedure that involves application of torque to one or more fasteners of a vehicle component (e.g., indicating to torque a cylinder head to an engine block or a wheel to a hub). A technician's view can then be augmented with a torque specification and/or torque pattern at an appropriate time to assist the technician in performing the identified step.

As another example, the supplemental service information may include a location of a vehicle component within the vehicle. For instance, if a particular procedural step involves disconnecting a radiator hose, the supplemental information may be an indication that the location at which to disconnect the radiator hose is at the front of the intake manifold. This type of positional information may be displayed to a technician in a variety of ways. For instance, if the technician is viewing the supplemented service procedure on an HMD, the particular location may be highlighted or pointed to by a virtual arrow within an augmented reality presentation. Positional information may be displayed in other ways as well (e.g., as textual information or as part of a visual image of a 3D model of the vehicle).

In some examples, in order to identify a particular step of a procedure to supplement, one or more terms listed in the step may be matched to one or more terms of an interpretation rule. More specifically, the interpretation rule may be a mapping from particular terms listed in procedural steps to particular types of supplemental information to retrieve. The particular teams may be previously identified and stored as keywords to search for within vehicle service procedures. For instance, certain terms of an interpretation rule may be actions to be performed by a technician in performance of a procedure, such as to "fill," "drain," or "remove" a certain vehicle component or system. The term "fill" may map to one or more related types of information, such as a fluid capacity. The computing device may use the interpretation rule to identify fluid capacity as a particular type of supplemental information to include, and then may retrieve the fluid capacity for the particular vehicle component or system from a vehicle information database. Other types of keywords may be included within an interpretation rule as well or instead. For instance, names of particular vehicle systems or components that may be listed in procedural steps could be mapped to particular types of supplemental vehicle information as well.

In further examples, a computing device may determine when to display particular pieces of supplemental information based on one or more input signals received during performance of a procedure. In some examples, the input signals may be verbal inputs and/or physical action inputs that enable a technician to progress through a repair procedure. For instance, a specific verbal command or movement may cause a portable display to display a particular piece of supplemental information and/or a particular procedural step. For instance, the display may indicate that torque specifications for a fastener involved in a particular procedural step are available, and provide a technician with the option to select or view the specifications. Additional user commands may allow the user to change the view of certain supplemental information, such as by zooming in or changing a perspective. User commands may also allow a user to select particular procedural steps (e.g., the previous step or the next step), or select an entirely different repair procedure.

In additional examples, a supplemented service procedure may be provided to a technician via a portable display with a camera. For instance, an HMD with a camera may be used to visually present virtual indications of supplemental information overlaid on top of a video feed from the HMD. As a procedure is performed, video data from the camera may be used to determine when to display particular pieces of supplemental information and/or particular procedural steps. For instance, the video data may be processed to determine which procedural step a technician is currently on, or what particular action a technician is currently taking. Trigger events may be identified from the video data to trigger the display of particular service information. For instance, when the technician is about to disassemble a particular vehicle component (e.g., a door panel), supplemental disassembly information may be displayed to assist the technician (e.g., types of fasteners and where to pull, twist, or otherwise unfasten particular fasteners to avoid breaking the door panel or fasteners).

In further examples, a technician's view during performance of a procedure can be augmented with a labor time counter. More specifically, a particular service procedure may be supplemented with an amount of time to complete the procedure. This amount of time may be used to provide a technician with an indication of whether he is on pace to complete the procedure within the allotted amount of time. For instance, the counter may indicate the time elapsed relative to the provided amount of time, or an amount of time remaining (e.g., as a countdown clock). To determine this amount of time, past completion times for the procedure may be accumulated and combined (e.g., averaged). The past completion times may be restricted to particular types of vehicles (e.g., YMME slices), locations (e.g., one or more repair shops or geographical regions), and/or time periods. In additional examples, separate completion times for individual steps may be determined and included as supplemental information as well or instead. For instance, a technician may be presented with a separate countdown clock for each step of a procedure.

In additional examples, certain vehicle usage information, such as vehicle mileage and geography, may be received by a computing device and used to determine one or more pieces of supplemental information to include within an augmented vehicle service procedure. Further, trend data may be determined based on past repairs performed on vehicles with one or more common attributes. For instance, one or more vehicle components may be identified for inspection by a technician based on the current mileage of the vehicle approaching a point at which the components may be predicted to fail based on past failures in other vehicles. Additionally, the one or more components may be located proximate to a vehicle component already involved in the procedure such that it may be efficient for a technician to inspect the components at the same time. As a specific example, a technician may remove certain vehicle components while servicing an engine, including a timing belt. A computing device may locate warnings about the timing belt, such as an indication that the timing belt is recommended to be replaced at 50,000 miles, when the vehicle currently has 39,000 miles. The technician may then be presented with a notification to inspect the timing belt, and possibly other relevant information as well such as what types of wear or failures to look for, and how close the current vehicle mileage is to the mileage limit for the component.

In further examples, prior service history of a particular vehicle may also be used to determine one or more pieces of supplemental service information to include within a supplemented service procedure. For instance, a technician's view may be augmented with warnings based on past service repairs performed on the vehicle at the same repair shop and/or at other repair shops (e.g., service records). As a specific example, a transmission seal on a vehicle may have been nicked during installation of a clutch shaft during a past repair procedure performed on the vehicle. A technician may be provided with a warning to be careful with this part to avoid exacerbating the problem.

In additional examples, a vehicle service procedure may also be supplemented with notifications received during performance of the procedure. For instance, the procedure may require one or more replacement parts to be installed in the vehicle. A technician's view may be supplemented with notifications from a repair shop parts department indicating when certain replacement parts are available. In some examples, these notifications may be provided to a technician one or more steps before the parts are actually needed to perform the procedure. By providing advance notice, a technician may be better able to plan out his schedule, which may be particularly helpful when the technician is performing a number of procedures on several different vehicles in parallel. As another example, a technician's view may be augmented to indicate when a customer has given approval to proceed with a particular procedure or procedural step. A customer approval notification may also be provided to a technician one or more steps before a particular procedural step that the customer approval affirms.

As previously noted, a technician may view an augmented service procedure using a variety of computing devices, including touchpad devices, laptops, wearable computing devices (e.g., glasses, goggles, wrist displays), and other types of portable displays. In some examples, the technician's view can also be augmented with data obtained from a vehicle scan tool. Additionally, a portable wearable display can communicate via multiple protocols (e.g., wifi and Bluetooth), and can also link with multiple devices simultaneously (e.g., a remote server providing a supplemented vehicle procedure and a diagnostic vehicle scan tool). Other types of devices and combinations of devices may also be used to provide and/or display augmented vehicle service procedures as well.

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of 1st, 2nd, 3rd, and so on.

Additional functionalities and examples of the described methods and computing devices are also described hereinafter with reference to the accompanying figures.

Referring now to the Figures, FIG. 1A illustrates an example system 100. As shown in FIG. 1, the example system 100 includes a computing device 102, a vehicle service procedures database 110, a vehicle information database 112, a communication network 114, and a client device 122. The client device 122 can represent any type of mobile or stationary computing device. By way of example, the client device 122 can be a computer that is located at a repair shop. However, the example is not meant to be limiting. In other instances, the client device 122 can be a laptop computer, tablet device, cellular phone, wearable computing device, including an HMD, glasses, goggles, a smartwatch or other wrist display, or another type of computing device.

The computing device 102 can similarly be any type of computing device. In one instance, the computing device 102 can be a server or a component of a server that is located remotely from the client device 122 (e.g., in a cloud computing environment). For example, the computing device 102 can be a desktop computer, workstation, or other type of computing device configured to operate within a client-server architecture. In another instance, the computing device 102 can be a computing device that is located at a repair shop. For example, the computing device 102 may be a computing device used by a repair shop to manage repair orders and/or shop equipment that is used to service vehicles. Other configurations are also contemplated.

The computing device 102 can include a memory 104 and a processor 106. Similarly, the client device 122 can also include a memory 124 and a processor 126. The processor 106 and the processor 126 can be any type of processors, such as a microprocessor, digital signal processor, multicore processor, etc., coupled to the memory 104 and memory 124 respectively. The memory 104 and the memory 124 can be any type of memories, such as volatile memory like random access memory (RAM), dynamic random access memory (DRAM), static random access memory (SRAM), or non-volatile memory like read-only memory (ROM), flash memory, magnetic or optical disks, digital versatile disk read-only memory (DVD-ROM), or compact-disc read-only memory (CD-ROM), among other devices used to store data or programs on a temporary or permanent basis.

Additionally, the computing device 102 can include a communication interface 108 and the client device 122 can include a communication interface 128. The communication interface 108 and the communication interface 128 can facilitate communication with the communication network 114 for the computing device 102 and the client device 122 according to one or more wired or wireless communication standards or protocols. For instance, the communication interface 108 and the communication interface 128 can facilitate data communication over one or more network links. The communication interface 108 and/or the communication interface 128 can include a transmitter to transmit data and a receiver to receive data. Alternatively, the communication interface 108 and/or the communication interface 128 can include a transceiver configured to transmit and receive data.

The client device 122 may also include a display 130. The display 130 could be any type of electronic visual display capable of presenting information visually to a technician. For instance, the display 130 could be capable of presenting visual information in a variety of ways, including text, two-dimensional visual images and/or three-dimensional visual images. In additional examples, the display 130 may be capable of presenting information to a technician in other ways (e.g., audio, haptics) as well or instead. Example displays include computer monitors, touchscreens, HMD's, or wrist displays. In some examples, the display 130 may be capable of displaying an augmented reality presentation in which the display shows a presentation of images or video taken of a vehicle during performance of a procedure with virtual annotations overlaid on the presentation to show additional supplemental information. Other types of electronic displays may also be used.

The vehicle service procedures database 110 can be or include a data storage device, such as a non-transitory computer-readable storage device. Although the vehicle service procedures database 110 is shown connected to the computing device 102 via the communication network 114, in another embodiment, the vehicle service procedures database 110 can be directly connected to or a component of the computing device 102. The vehicle service procedures database 110 can store a plurality of vehicle service procedures, which may be OEM procedures provided by manufacturers of different types of vehicles or vehicle components. Each service procedure can include a plurality of steps pertaining to a particular type of vehicle repair. In some examples, multiple vehicle service procedures databases may be accessible by computing device 102. For instance, each vehicle service procedures database may store service procedures pertaining to particular vehicle components or systems. Additionally, different vehicle service procedures databases may store service procedures pertaining to different types of vehicles different makes, models, years, etc.) as well or instead.

The vehicle information database 112 can be or include a data storage device, such as a non-transitory computer-readable storage device. Although the vehicle information database 112 is shown connected to the computing device 102 via the communication network 114, in another embodiment, the vehicle information database 112 can be directly connected to or a component of the computing device 102. Additionally, while vehicle information database 112 and the vehicle service procedures database 110 are illustrated here as separate databases, they could in other embodiments be separate sections of a single database, or otherwise included in a single non-transitory computer-readable medium. The vehicle information database 112 can store vehicle information (e.g., component metrics) for vehicles with different sets of attributes YMME). In some examples, multiple vehicle information databases may be accessible by computing device 102. For instance, separate vehicle information databases may store information pertaining to different vehicle components or systems. Additionally, separate vehicle information databases may store information pertaining to vehicles with different attributes as well or instead.

In additional examples, the vehicle information database 112 may include trend data for different types of vehicles as well or instead. The trend data may be determined based on an accumulation of past repair procedures performed by one or more repair shops. The vehicle information database 112 may also directly store repair orders with information about past vehicle repairs as well or instead.

The computing device 102 may be capable of searching the vehicle information database 112 for particular pieces of supplemental service information. In some instances, the vehicle information database 112 can also store search queries and associated search results from prior searches to facilitate quickly retrieving information from the vehicle information database 112. For instance, the computing device 102 can be configured to access a list of prior searches before searching the entire vehicle information database 112 to identify whether search results are already stored by the vehicle information database 112 for a given search. The stored search results may also be updated on a periodic basis by the vehicle information database 112 (e.g., when new repair orders or other vehicle information is received).

Figure 1B:
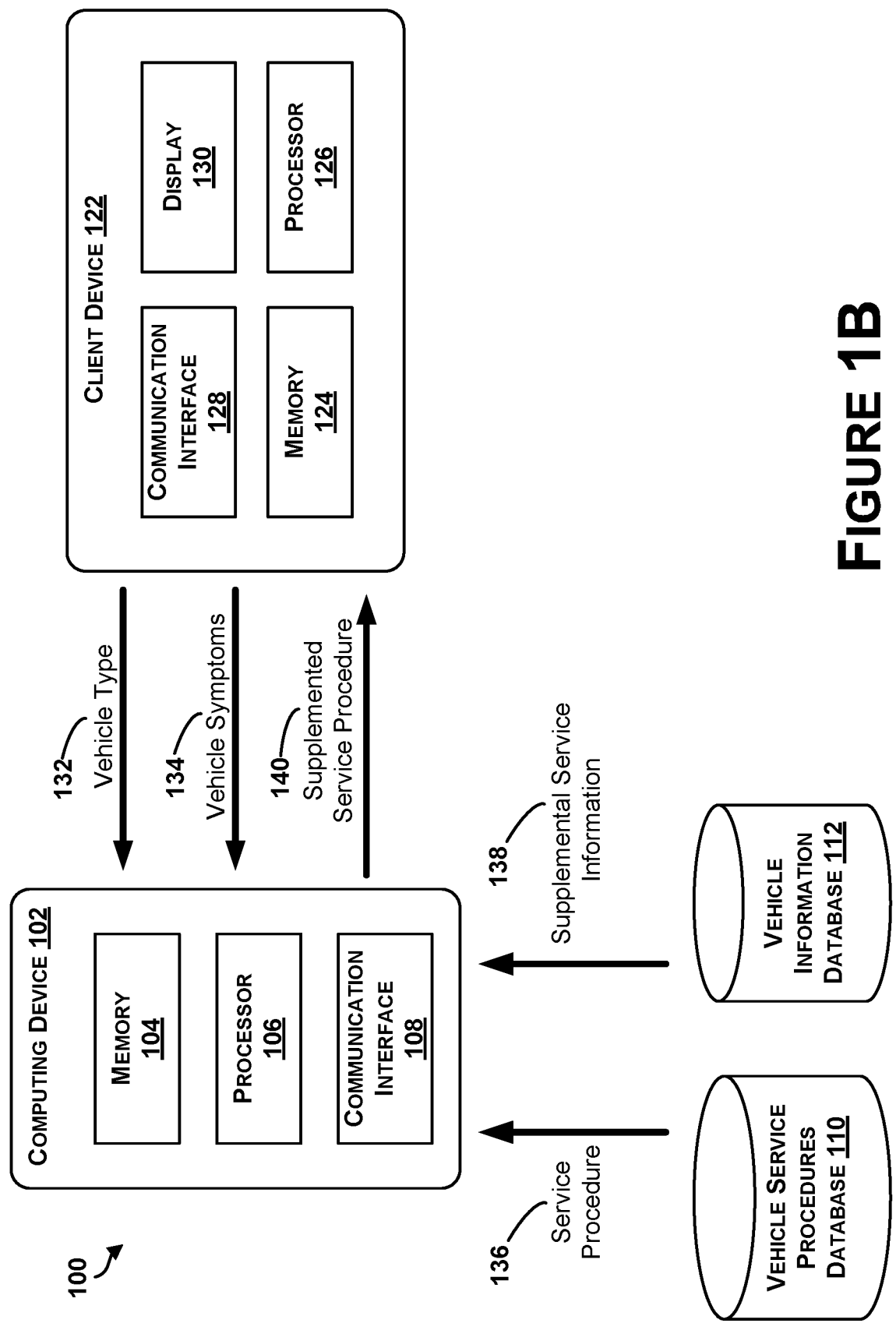

FIG. 1B illustrates an example workflow between the system components of FIG. 1A. More specifically, an example scenario is provided in which client device 122 receives with a supplemented service procedure 140 from computing device 102. Initially, the client device 122 may report certain information about a vehicle to be repaired to computing device 102, which may include a vehicle type 132 and vehicle symptoms 134. The vehicle type 132 may include vehicle attributes (e.g., year, make, model, engine type) as well as usage information (e.g., mileage, geography). The vehicle symptoms 134 may be one or more conditions exhibited by the vehicle and/or reported by a vehicle owner such as "engine hesitates on takeoff," "rough engine idle," "engine cranks but won't start," "poor gas mileage," or "check engine light is on." A check engine light can also be referred to as a malfunction indicator lamp that, when illuminated on an instrument panel of a vehicle, indicates a malfunction of a computerized engine management system of the vehicle. Alternatively or in addition, the vehicle symptoms 134 may include one or more DTCs and/or an indication that a malfunction indicator lamp of the vehicle is illuminated.

Based on the vehicle type 132 and the vehicle symptoms 134, the computing device 102 may identify at least one service procedure 136 from vehicle service procedures database 110 for servicing the vehicle. In some examples, the service procedure 136 may be an OEM procedure provided in an electronic format by a manufacturer of the vehicle type 132 and/or specific vehicle components. For instance, the service procedure 136 may include steps to locate and replace a particular electronic sensor contained within the engines of vehicles of vehicle type 132. In some examples, the service procedure 136 may be automatically selected by computing device 102 and/or client device 122 based on vehicle type 132 and vehicle symptoms 134. In other examples, the service procedure 136 may be manually selected by a technician using client device 122 via a user input interface of client device 122. Service procedure 136 may be identified from data source 110 in other ways as well.

After receiving service procedure 136, computing device 102 may process service procedure 136 to identify one or more steps of service procedure 136 to augment with supplemental service information 138. At least some of the supplemental service information 138 may be obtained from vehicle information database 112, which may include information describing vehicles sharing one or more attributes (e.g., YMME) with a vehicle of vehicle type 132. In further examples, supplemental service information 138 may be obtained from one or more other sources as well or instead.

The supplemental service information 138 may be incorporated within one or more steps of service procedure 136 by computing device 102 to produce supplemented service procedure 140. Supplemented service procedure 140 may be provided by computing device 102 in an electronic format that can be displayed by client device 122 on display 130. For instance, client device 122 may then provide visual, audio, and/or other indications of the supplemental service information 138 while the technician performs corresponding steps of the supplemented service procedure 140 on the vehicle.

FIG. 1C illustrates several example client devices. More specifically, computing device 102 may communicate with one or more client devices through communication network 114 via one or more respective communication links. For instance, computing device 102 may communicate with laptop computer 122A via communication link 152A, HMD 122B via communication link 152B, and/or touchpad device 122C via communication link 152C. Computing device 102 may transmit information to one or more of client devices 122A, 122B, and/or 122C all at once, or computing device 102 may transmit information periodically. In some examples, computing device 102 may transmit and/or receive certain pieces of information to and/or from one or more of client devices 122A, 122B, and/or 122C while a technician performs a service procedure on a vehicle with the assistance of one or more of the client devices. In further examples, additional client devices may be used to receive and display a supplemented service procedure than those specifically illustrated here as well.

Figure 2:
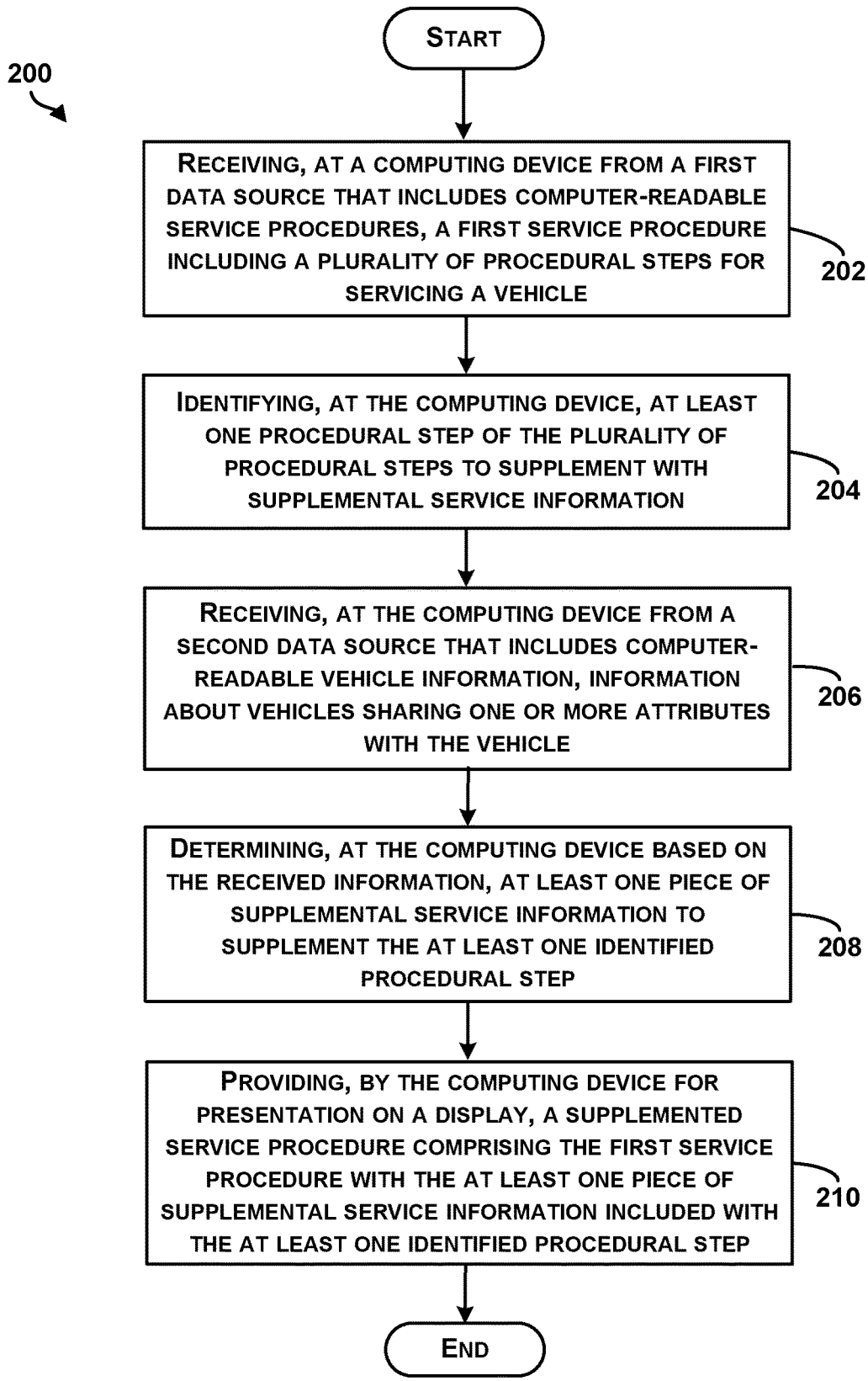
FIG. 2 is a block diagram of a method, according to an example embodiment.

Turning now to FIG. 2, FIG. 2 is a block diagram of an example method 200 for providing a supplemented service procedure. Method 200 shown in FIG. 2 presents an embodiment of a method that could be used or implemented by computing device 102 and/or client device 122 of FIG. 1, for example, or by components of computing device 102 and/or client device 122, or more generally by any of a variety of computing devices. Method 200 can include one or more operations, functions, or actions as illustrated by one or more of blocks 202-210. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block can represent a module, a segment, or a portion of program code, which includes one or more instructions executable by a processor or computing device for implementing specific logical functions or steps in the process. The program code can be stored on any type of computer-readable medium, for example, such as a storage device including a disk or hard drive. The computer-readable medium can include non-transitory computer-readable medium, for example, such as computer-readable media that stores data for short periods of time like register memory, processor cache and random access memory (RAM). The computer-readable medium can also include non-transitory media, such as secondary or persistent long term storage, like read only memory (ROM), optical or magnetic disks, compact-disc read only memory (CD-ROM), for example. The computer-readable medium can also be any other volatile or non-volatile storage systems. The computer-readable medium can be considered a computer-readable storage medium, for example, or a tangible storage device.

In addition, for the method 200 and other processes and methods disclosed herein, each block in FIG. 2 can represent circuitry that is wired to perform the specific logical functions in the process.

Initially, at block 202, the method 200 includes receiving a first service procedure that includes a plurality of steps for servicing a vehicle. More specifically, the first service procedure may be received by a computing device from a data source that includes computer-readable service procedures, such as OEM procedures. In some examples, the first service procedure may be received at a point in time before a vehicle is brought in for service. In particular, the service procedure may be supplemented in advance for one or more different types of vehicles. In other examples, the first service procedure may be received in response to a request from a client device, such as an HMD used by a technician while servicing a particular vehicle. In further examples, the first service procedure may be received from the client device itself or from another source.

Figure 3:
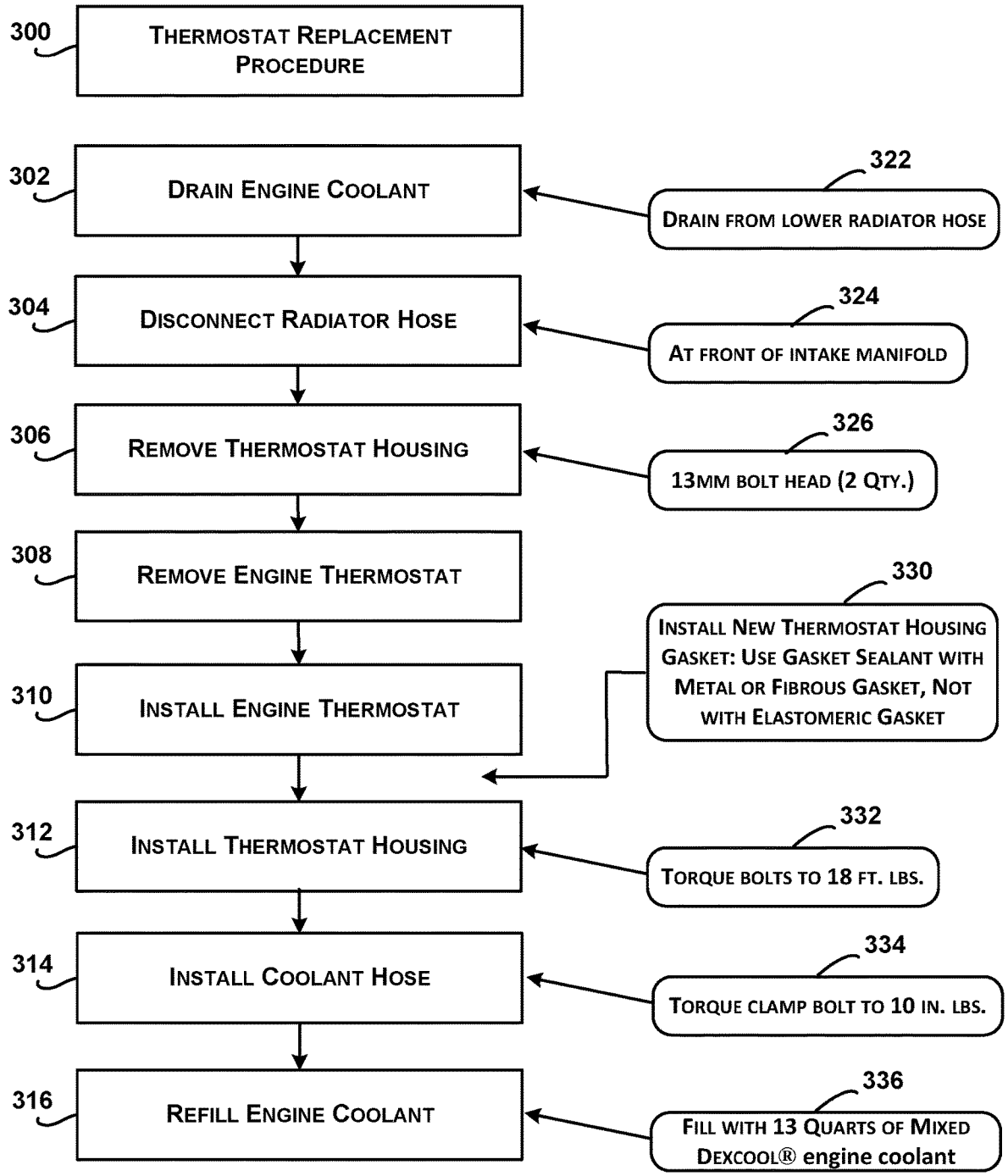
FIG. 3 illustrates a vehicle service procedure with supplemental service information according to an example embodiment.

FIG. 3 illustrates an example vehicle service procedure. More specifically, thermostat replacement procedure 300 may include steps 302-316 for replacing an engine thermostat in a particular type of vehicle, such as a 2007 Chevy Cobalt. Each block 302-316 may represent a section of computer-readable medium accessible by a client device to display each of the steps 302-316. In some examples, each of the blocks 302-316 may include a module, a segment, or a portion of program code, which includes one or more instructions executable by a processor or computing device to provide a presentation of the steps 302-316, the display of which may include various types of visual, auditory, and/or other types of output. Various types of information may be included within blocks 302-316, and made accessible to a technician during performance of the procedure. Other vehicle service procedures may include fewer or more steps than thermostat replacement procedure 300 illustrated here. Additionally, other types of supplemental service information than those specifically illustrated within this example may be included within a supplemented service procedure as well. Further, a vehicle service procedure may apply to various types of vehicles, including, for example, multiple years of a particular model, or multiple models of a particular make.

Referring back to FIG. 2, method 200 may further involve identifying at least one procedural step to supplement with supplemental service information, as shown by block 204. More specifically, the computing device may process the steps of the received procedure to identify where supplemental information may be inserted to assist a technician in performance of the procedure. In some examples, this step may involve identifying particular vehicle components or systems involved in the procedure for which supplemental information is available. The components may be specifically listed in the steps or determined based on the functions to be performed that are instructed by the steps. In further examples, steps may be identified to supplement by searching for one or more keywords within the procedural steps. Steps may be identified to supplement with supplemental information in other ways as well. In some examples, identifying steps to supplement may further involve determining that a provided procedure or procedural step does not already include certain types of information before retrieving the information for a particular vehicle to add as supplemental information.

In reference to FIG. 3, a computing device may identify several steps of thermostat replacement procedure 300 to supplement with supplemental information. In particular, steps 302, 304, 306, 312, 314, and 316 may be identified as steps to add one or more pieces of supplemental information. Additionally, steps 308 and 310 may not be identified as steps to add supplemental information. Each of the steps 302, 304, 306, 312, 314, and 316 to supplement may be identified at a single time, or some of the steps may be identified at different times, possibly during performance of the procedure. Additionally, the respective pieces of supplemental information for each of the steps 302, 304, 306, 312, 314, and 316 may be determined at the same time that the steps are identified, or at a later time. In some examples, certain types of information to include with particular steps may first be identified, and then one or more vehicle information sources may be queried to find information of the chosen types for a particular vehicle type.

One or more of the steps 302, 304, 306, 312, 314, and 316 may be identified to augment based on one or more components involved in the steps. The components may be listed by name within the procedural steps and/or may be inferred based on the operations to be performed in the steps. For example, step 304 may be identified because it involves a radiator hose, step 306 and/or step 312 may be identified because each involves a thermostat housing, and/or step 314 may be identified because it involves a coolant hose. Additionally, one or more of the steps 302, 304, 306, 312, 314, and 316 may be identified based on one or more keywords listed in the steps. In some examples, the keywords may correspond to actions to be performed by a technician in performing the procedure. For instance, step 302 may be identified based on the keyword "drain" and/or step 316 may be identified based on the keyword "refill." In additional examples, a combination of components involved and actions to be performed may be used to identify steps to augment.

In further examples, one or more of the steps 302, 304, 306, 312, 314, and 316 may be identified to augment in other ways as well or instead. For instance, a mapping between types of operations and types of supplemental information may be predetermined. The mapping may then be applied to different procedures to identify steps involving operations for which supplemental information should be retrieved. In some examples, the types of operations in the mapping may be identified by labor operation codes (LOC's) that refer to particular operations that can be performed to a given vehicle. The LOCs can conform to those defined by a vehicle manufacturer, a service provider that generates a repair order, a service information provider, or some other entity.

Referring back to FIG. 2, the method 200 may further involve receiving information about vehicles sharing one or more attributes with the vehicle, as shown by block 206. More specifically, the computing device may request particular types of vehicle information from at least one supplemental data source that is separate from the first data source which provided the service procedure. The one or more attributes may include any vehicle characteristics that may signify a type of vehicle, which may include, for example, year, make, model, engine type, other specific component types, other design options, vehicle mileage, and/or geographic history. In some examples, the supplemental data source may be queried for particular types of information (e.g., metrics, specifications, or locations of components) that relate to the type of vehicle to be serviced. In further examples, different common attributes may be used to indicate related vehicles based on the particular types of information sought. Additionally, multiple separate supplemental data sources may be queried to obtain different types or pieces of information.

The method 200 may further involve determining at least one piece of supplemental service information to supplement the at least one identified procedural step, as shown by block 208. More specifically, the received information about vehicles sharing one or more common attributes with a particular vehicle may be processed to identify supplemental service information to include with steps of the service procedure. In some examples, certain pieces of received vehicle information may be directly added to augment procedural steps. In other examples, the received vehicle information may first undergo some processing or transformation. For example, the received vehicle information may indicate where bolts are located on a particular vehicle component. Based on this information, a computing device may determine how a technician should position a wrench to remove the bolts, and the wrench positions may then be visually displayed as supplemental service information. In other examples, a computing device may search the supplemental data source to see what information is available (e.g., related to a particular vehicle component), and then select particular information to include within a supplemented procedure based on what information is available and what operations the procedural step involves.

In reference to FIG. 3, several examples of supplemental service information are illustrated for steps of thermostat replacement procedure 300. For instance, step 302 which indicates to drain engine coolant may be supplemented with supplemental information 322 indicating to drain from lower radiator hose. In this example, the supplemental information 322 indicates to a technician a particular vehicle component (e.g., the lower radiator hose) on which to perform an operation within the vehicle. The supplemental information 322 may additionally indicate where the lower radiator hose is within the vehicle.

In additional examples, other pieces and/or types of supplemental information may be added to step 302 as well or instead. Another example class of supplemental information includes safety precautions or warnings. For instance, step 302 may be supplemented with a warning indicator, such as "Warning: Engine coolant may be very hot and pressurized. Release cooling system pressure by turning radiator cap one-quarter turn counter-clockwise." In further examples, warning signals may correspond to particular vehicle components, particular types of operations, or a combination of factors.

As another example, step 304 which indicates to disconnect the radiator hose may be supplemented with supplemental information 324 indicating to perform the operation at the front of the intake manifold. In this example, the supplemental information 324 includes a positional reference indicating a location (e.g., at the front of the intake manifold) within a particular type of vehicle at which a technician should perform an operation (e.g., disconnect the radiator hose). The supplemental information 324 may be different for other types of vehicles (e.g., a vehicle for which this operation is to be performed at a different location).

As a further example, step 306 which indicates to remove thermostat housing may be supplemented by supplemental information 326 identifying two bolts with 13 millimeter bolt heads. In this example, the supplemental information 326 provides metrics related to fasteners that must be removed by a technician to perform the step. For instance, this information may be used by a technician to select a tool to remove the bolts. The supplemental information 326 may include additional information related to how to remove the thermostat housing as well, such as where the bolts are located in a particular vehicle and/or how to position a wrench to remove the bolts.

As another example, step 312 which indicates to install thermostat housing may be supplemented by supplemental information 332, indicating to torque the bolts to 18 foot-pounds. Additionally, step 314 which indicates to install the coolant hose may be supplemented by supplemental information 334, indicating to torque the clamp bolt to 10 inch-pounds. In these examples, the respective pieces of supplemental information 332 and 334 indicate to a technician how much torque to apply when attaching certain fasteners. Additional torque specifications may be provided as supplemental information as well or instead. Torque patterns indicating a sequencing to apply torque to different fasteners may also be provided as supplemental information as well or instead.

As a further example, step 316 which indicates to refill engine coolant may be supplemented with supplemental information 336 indicating to fill with 13 quarts of mixed Dexcool® engine coolant. In this example, the supplemental information 336 indicates both an amount of fluid and a type of fluid for a technician to use in filling a particular vehicle system in further examples, other fluid specifications may be provided as supplemental information for particular vehicle components or systems involved in particular procedural steps as well or instead. As another example, the supplemental information may indicate when and how to add a fluid (e.g., to check transmission fluid with the engine running, or to check the engine oil when the engine is stopped).

In further examples, one or more pieces of supplemental information may be provided as additional steps in the supplemented service procedure as well or instead. For instance, in reference to FIG. 3, supplemental information 330 may be added to indicate an additional step to install a new thermostat housing gasket. The supplemental information 330 may be provided between existing steps 310 and 312. In some examples, supplemental information 330 may be determined based on tips learned from past repair orders or technician notes. For instance, past repair orders may indicate that an OEM procedure omits a particular step, or that certain types of service procedures sometimes omit particular steps. In this case, supplemental information 330 may include both an additional operation to be performed as well as information indicating how to perform the operation (e.g., to install the new gasket using a gasket sealant with metal or fibrous gasket, not with elastomeric gasket).

Referring back to FIG. 2, the method 200 may further involve providing a supplemented service procedure for display as shown by block 210. More specifically, the supplemented service procedure may include the steps of the first service procedure with at least one piece of supplemental information included with at least one of the procedural steps. The supplemented service procedure may be provided in a digital format that enables a client device to display the supplemental information as, for example, text, images, as part of an augmented reality presentation, and/or as auditory feedback. In some examples, the supplemented service procedure may be determined at a point in time before a particular type of vehicle arrives for servicing. The supplemented service procedure may then be stored digitally and accessed at a later point in time. In other examples, some or all of the supplemental information included in the supplemented service procedure may be determined after a vehicle of a particular type arrives for servicing and/or during performance of one or more steps of the procedure.

In some examples, the supplemented service procedure may include supplemental information for certain procedural steps as well as one or more triggers indicating when to display the information during performance of the procedure. The triggers may be based on one or more user input actions, such as vocal input or movement. For instance, a user may request via a client device to see torque specifications before unfastening a particular vehicle fastener, and the torque specifications may then be displayed on the client device as supplemental service information. In further examples, the triggers may be based on video data of the vehicle (e.g., from an HMD) as the procedure is performed. For instance, the video data may be processed to determine that a technician is about to apply torque to a particular bolt, and then an amount of torque to apply may be displayed to the technician as supplemental information. In further examples, a technician may also be able to change the view of certain supplemental information (e.g., to zoom in on an image) during performance of the procedure.

As noted, supplemental information may be displayed or otherwise presented to a technician using a client device in a variety of ways. In some examples, different modes of presenting information may be used depending on the type of client device available. For instance, supplemental information may be presented as text on a wrist display, as computerized images on a touchpad, or as overlaid virtual annotations on an HMD that is oriented towards the vehicle. Other methods of computerized presentation of information may also be used.

FIGS. 4A, 4B, 4C, and 4D are conceptual illustrations of example features of a display interface of a computing device. For instance, the display interface can be an interface of a client device that receives a supplemented service procedure and displays procedural steps with supplemental information to a technician. The display interface may be an interface of any of the types of client devices described herein, including a laptop computer, a stationary computer, a wearable computing device including an HMD or a wrist display, a smartphone, or a touchpad device. Additionally, while supplemental information is displayed as text here, it could be displayed graphically, as computerized images, or as some other type of presentation.

Figure 4A:
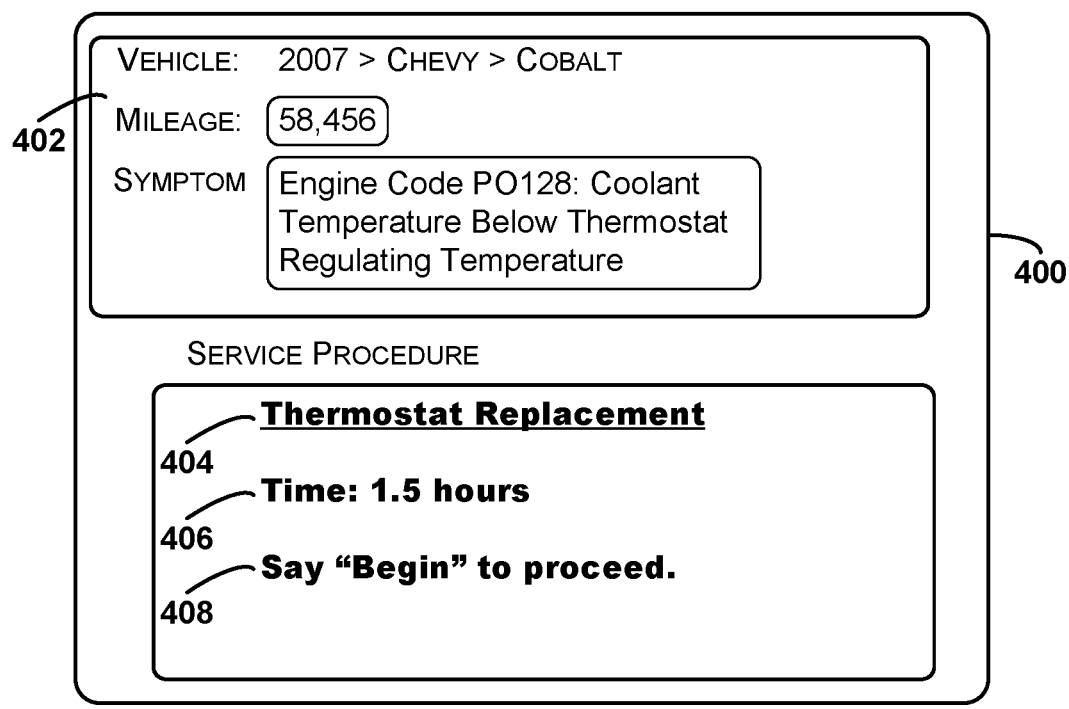
FIGS. 4A, 4B, 4C, and 4D are conceptual illustrations of features of a display interface of a computing device, according to an example embodiment.

In reference to FIG. 4A, an example display interface 400 is illustrated for a client device. A technician can specify certain vehicle information 402 via the interface 400, which may be used to determine a vehicle service procedure to service a particular vehicle. By way of example, the interface 400 displays vehicle information 402 that includes a vehicle identifier (2007 Chevy Cobalt), mileage (58,456), and a symptom (Engine Code PO128: Coolant Temperature Below Thermostat Regulating Temperature). In other examples, some or all of vehicle information 402 may be determined automatically by a client device (e.g., by receiving identifying information and/or diagnostic codes directly from the vehicle).

Based on the vehicle information 402, a service procedure may be selected to service the vehicle, in this case, the selected service procedure is thermostat replacement 404. In some examples, the service procedure may be selected by a technician via the interface 400 (e.g., by selecting the service procedure from a dropdown list of procedures). In further examples, the selected service procedure may be obtained from a repair order for the vehicle. In other examples, the service procedure may be automatically determined by the client device and/or by a remote server system based on the vehicle information 402. In any case, the client device may be provided with a supplemented service procedure that incorporates certain pieces of supplemental information at one or more steps. At least some of the supplemental information may be determined based on vehicle sharing one or more attributes with the vehicle (e.g., other 2007 Chevy Cobalts).

In addition to identifying the service procedure as thermostat replacement 404, the display interface 400 may display an amount of time 406 to complete the procedure, shown here as 1.5 hours. In some examples, the amount of time 406 may be provided as supplemental information. For instance, the amount of time 406 may be determined based on past completion times of the thermostat replacement procedure on other vehicles. The past completion times used to determine the amount of time 406 may be restricted to particular types of vehicles (e.g., YMME slices), locations (e.g., one or more repair shops or geographical regions), and/or time periods. The amount of time 406 may be determined by averaging together or otherwise combining the past completion times.

The display interface 400 may additionally contain an instruction 408 that allows a technician to give a vocal command ("Begin") to start the procedure. In other examples, the first step of the procedure may automatically be displayed when the device recognizes that a technician has started the procedure. For instance, the device may be an HMD which receives video data of the vehicle. When the video data indicates that the procedure has begun, the display interface 400 may display the first step of the procedure along with any supplemental information. A countdown clock starting from the amount of time 406 may also start based on the video data indicating that the technician has started the procedure.

Figure 4B:
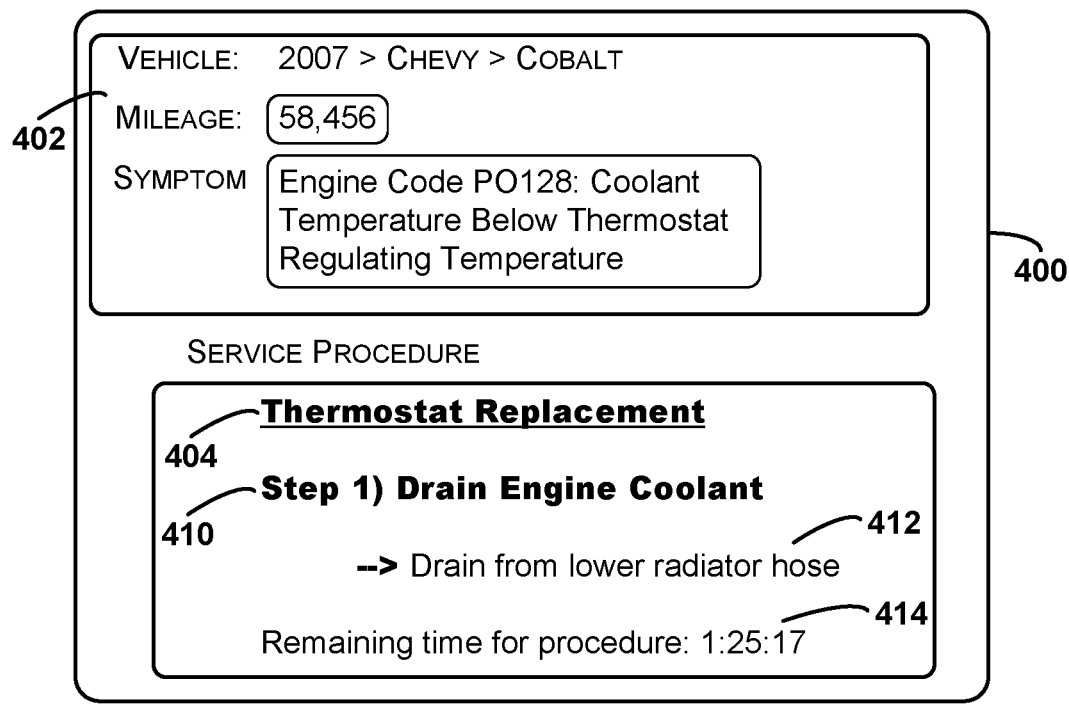

FIG. 4B illustrates an example display of a client device showing a first step of a supplemented procedure. More specifically, the first step 410 of the procedure for thermostat replacement 404 may be to drain the engine coolant. This step may be part of the original service procedure before augmentation. The first step 410 of the procedure may be augmented (e.g., by a remote server system) to include additional supplemental information 412. The supplemental information 412 in this example includes an identification of a vehicle component to indicate that the engine coolant is to be drained from the lower radiator hose. The supplemental information 412 may be displayed in other ways as well or instead. For instance, an image of the vehicle may be displayed with an arrow pointing to the lower radiator hose. In some examples, the supplemental information 412 may only be displayed on display 400 in response to a user query (e.g., asking where to drain the engine coolant).

The display 400 may additionally show a remaining amount of time 414 counting down from the initial amount of time 406 displayed in FIG. 4A. The remaining amount of time 414 may provide a technician with an indication of how fast he is progressing through the procedure relative to an expected completion time. In further examples, one or more warning signals may be provided indicating when the technician is running behind a pace estimated to complete the procedure in the expected amount of time.

Figure 4C:
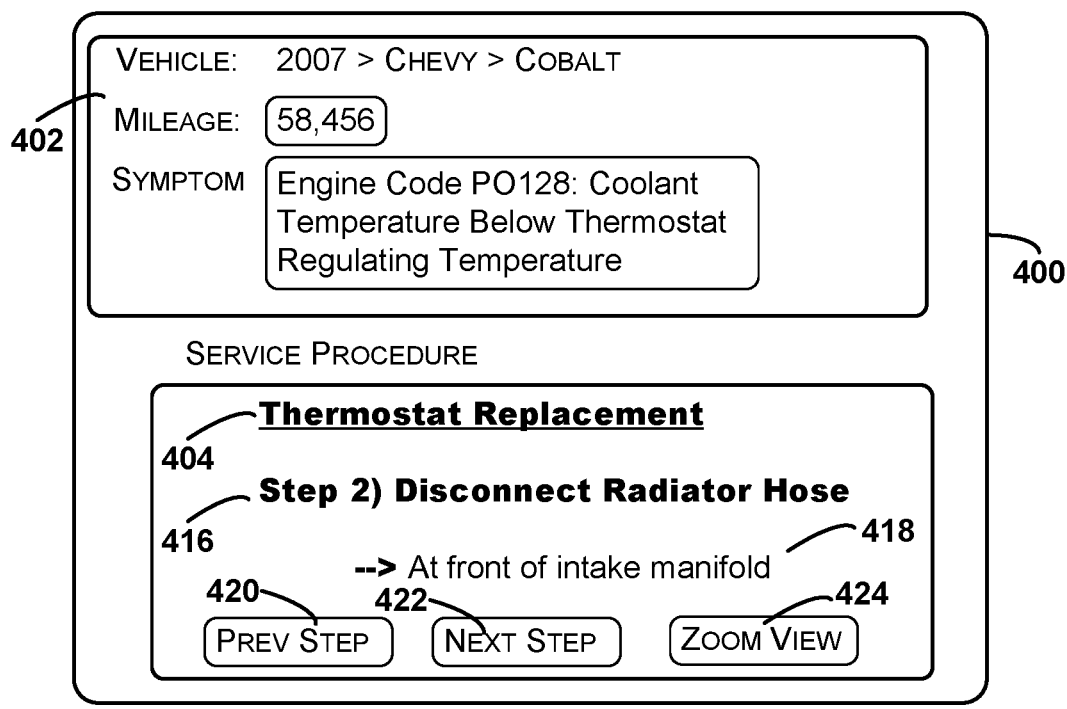

FIG. 4C illustrates another example display of a client device showing another step of a supplemented service procedure. More specifically, the second step 416 of the procedure for thermostat replacement 404 may be augmented to include additional supplemental information 418.

In this example, the supplemental information 418 includes a positional reference to a particular location (e.g., at the front of the intake manifold) in the vehicle at which to perform the step (e.g., to disconnect the radiator hose).

As shown in FIG. 4C, additional options may be presented to a technician via display interface 400 to allow a technician to navigate through a procedure. In particular, the technician may be able to navigate to the previous step 420 or the next step 422. Additionally, the technician may be able to select zoom view 424 to provide a closer view of a portion of the vehicle. For instance, in this case, zoom view 424 may provide a magnified view of the location at the front of the intake manifold at which to disconnect the radiator hose. Other selectable options may be presented as well or instead. In some examples, the particular selectable options available for a given procedural step may depend on what supplemental service information is available for the step within the supplemented service procedure.

Figure 4D:
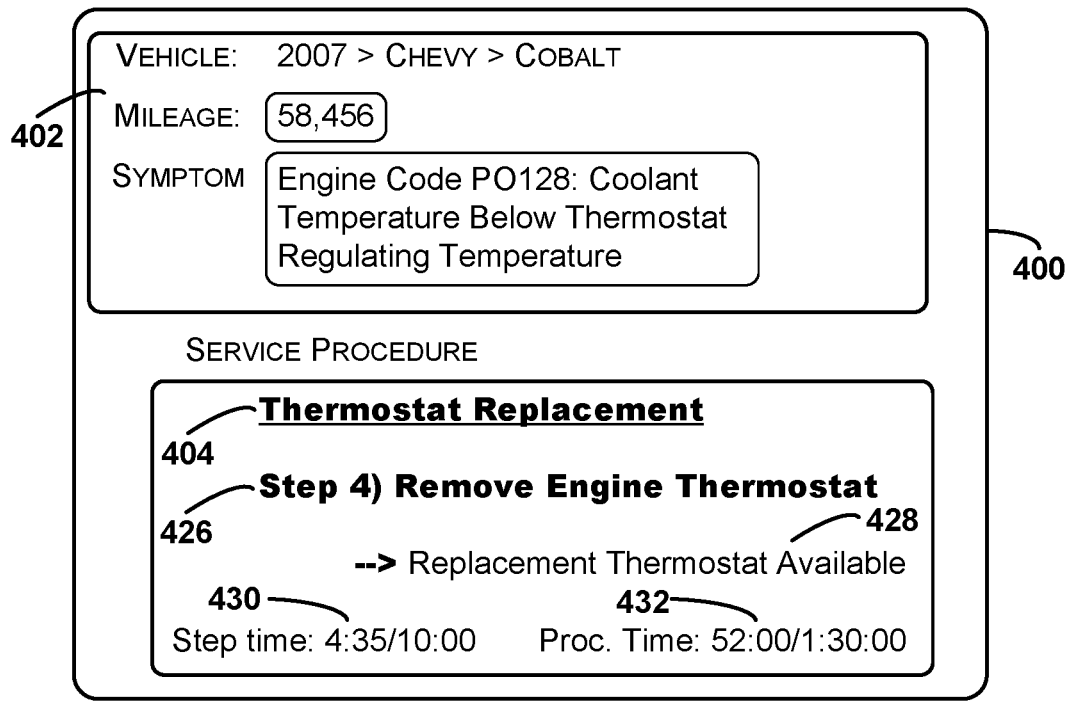

FIG. 4D illustrates an additional example display of a client device showing an additional step of a supplemented service procedure. More specifically, the fourth step 426 of the service procedure for thermostat replacement 404 may be to remove the engine thermostat. In this example, supplemental information 428 may be provided to indicate that a replacement thermostat is available. A notification may be provided to the client device during performance of the procedure indicating that the replacement part is available (e.g., from the parts department of a repair shop). The supplemental information 428 therefore may be determined during performance of the procedure in this case. As illustrated here, the notification may be provided at a procedural step one or more steps in advance of when the part is needed (e.g., when the replacement thermostat will be installed). Advanced notice may assist a technician in planning out his schedule. Other types of supplemental information may be determined during performance of the procedure as well. For instance, an indication that a customer has approved the procedure or a certain portion of the procedure may be indicated on the display interface 400 when the customer approval is received (e.g., from a different area of a repair shop).

As shown in FIG. 4D, the display may also display a separate elapsed amount of time 430 for the current procedural step 426 in addition to or instead of an elapsed amount of time 432 for the full procedure. The elapsed amount of time 430 for the particular step 426 may be displayed relative to an expected completion time of the particular step 426, which may be determined based on past completion times of the particular step 426. For instance, in this example, the display indicates that 4 minutes and 35 seconds have elapsed from an expected 10 minutes to remove the engine thermostat, and that 52 minutes have elapsed from an expected 1 hour and 30 minutes to complete the full thermostat replacement procedure. The expected time of 10 minutes to complete the step may be determined based on past step completion times that are restricted to particular types of vehicles (e.g., YMME slices), locations (e.g., one or more repair shops or geographical regions), and/or time periods. The expected time may be determined by averaging together or otherwise combining the past a completion times.

In further examples, the computing device may record an amount of time spent by a technician in performing a service procedure and/or respective amounts of time to complete particular procedural steps. In some examples, timing information may only be recorded after receiving user approval. The recorded time(s) may be stored (e.g., in vehicle information database 112 as described in reference to FIG. 1) and used to determine expected time(s) to complete the procedure or individual procedural steps on other vehicles in the future.

Figure 5:
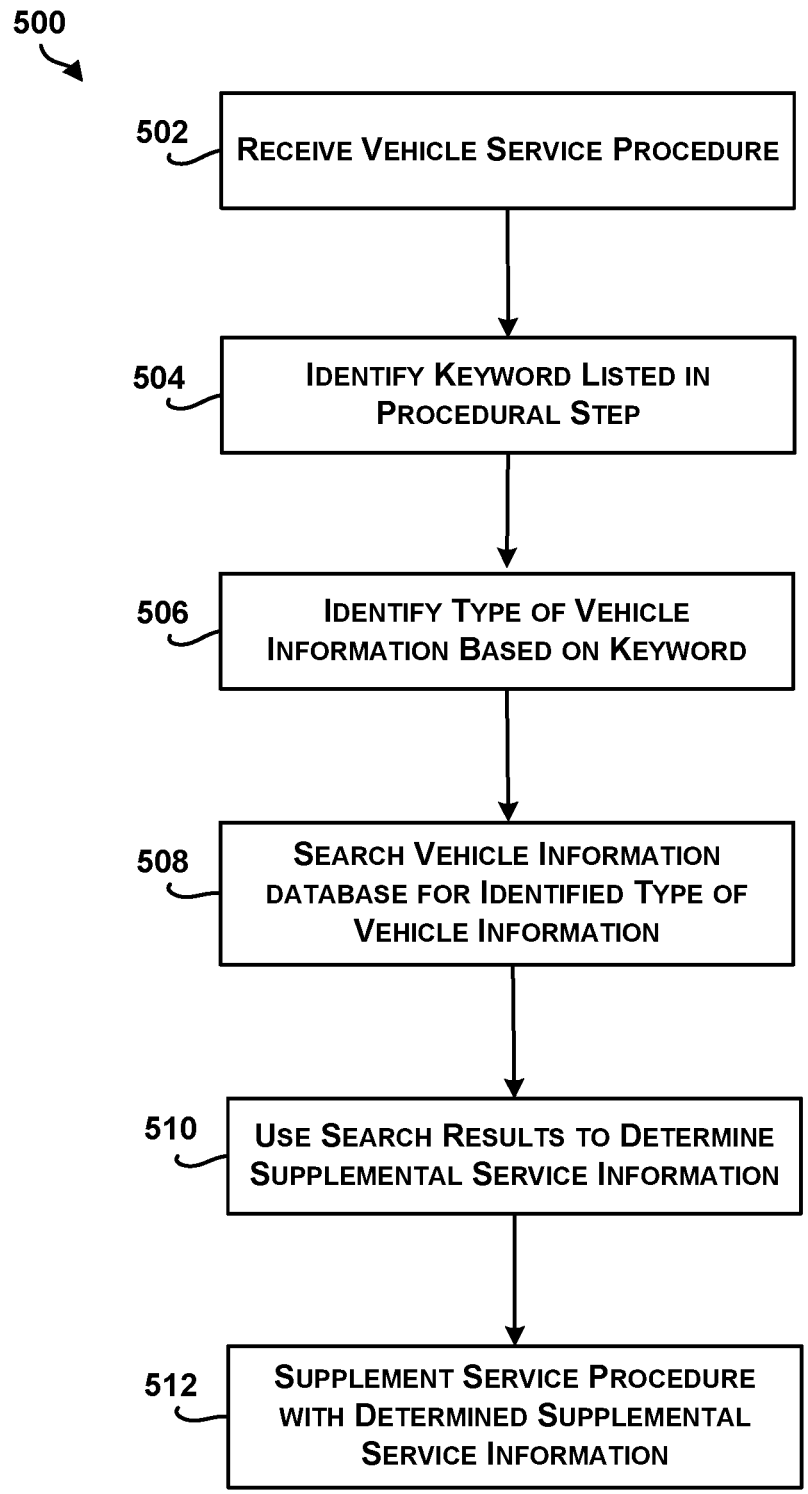
FIG. 5 is a flow chart of an example method for using keywords to determine supplemental service information, according to an example embodiment.

Turning now to FIG. 5, FIG. 5 is a block diagram of an example method 500 for using keywords to determine a supplemented service procedure. Method 500 shown in FIG. 5 presents an embodiment of a method that could be used or implemented by the computing device 102 of FIG. 1, for example, or by components of the computing device 102 of FIG. 1, or more generally by any of a variety of computing devices. Method 500 can include one or more operations, functions, or actions as illustrated by one or more of blocks 502-512. Although the blocks are illustrated in a sequential order, these blocks can also be performed in parallel, and/or in a different order than those described herein. Also, the various blocks can be combined into fewer blocks, divided into additional blocks, and/or removed based upon the desired implementation. Each block can represent a module, a segment, or a portion of program code, which includes one or more instructions executable by a processor for implementing specific logical functions or steps in the processor. In addition, each block in FIG. 5 can represent circuitry that is wired to perform specific logical functions in the process.

Initially, at block 502, the method 500 includes receiving a vehicle service procedure. The vehicle service procedure may be received by a computing device in a computer-readable format from a data source that includes computer-readable service procedures, and may include a plurality of steps for servicing a vehicle.

At block 504, the method 500 further includes identifying a keyword listed in a procedural step of the vehicle service procedure. More specifically, a predetermined set of keywords may be included in an interpretation rule that maps the keywords to corresponding types of vehicle information. The keywords could be textual references to "fill," "drain," "remove," or other operative language that may correspond to information that would be of interest to a technician performing the operation. Different types of keywords may be used as well or instead, such as vehicle component names.

At block 506, the method 500 additionally includes identifying a type of vehicle information based on the keyword. The keyword may correspond to one or more types of interest that may be of interest to a technician performing the step containing the keyword. Additionally, this correspondence may be predetermined as part of an interpretation rule. For instance, "fill" could map to a type of fluid to fill a vehicle component with, while "drain" could map to a location in the vehicle at which to drain the fluid from. Particular keywords may map to multiple types of vehicle information as well.

At block 508, the method 500 also includes searching the vehicle information database for the identified type of vehicle information. Once a particular type of vehicle information to include is identified, the information for a particular vehicle may be determined by searching a database of information about vehicle sharing one or more attributes with the particular vehicle. For instance, if the identified type of information is a location of a particular vehicle component, the location of the particular vehicle component in a particular type of vehicle (e.g., with a particular YMME) may be retrieved from an appropriate database.

At block 510, the method 500 further includes using the search results to determine supplemental service information for the vehicle. Additionally, at block 512, the method also includes supplementing the service procedure with the determined supplemental service information. Once a relevant type of information is identified based on a keyword and information of the relevant type for the particular vehicle is retrieved, the information may be incorporated into the step of the supplemented service procedure containing the identified keyword. For instance, the step of "Drain Engine Coolant" may be supplemented with information indicating to drain the engine coolant from the lower radiator hose in a 2007 Chevy Cobalt.

Figure 6:
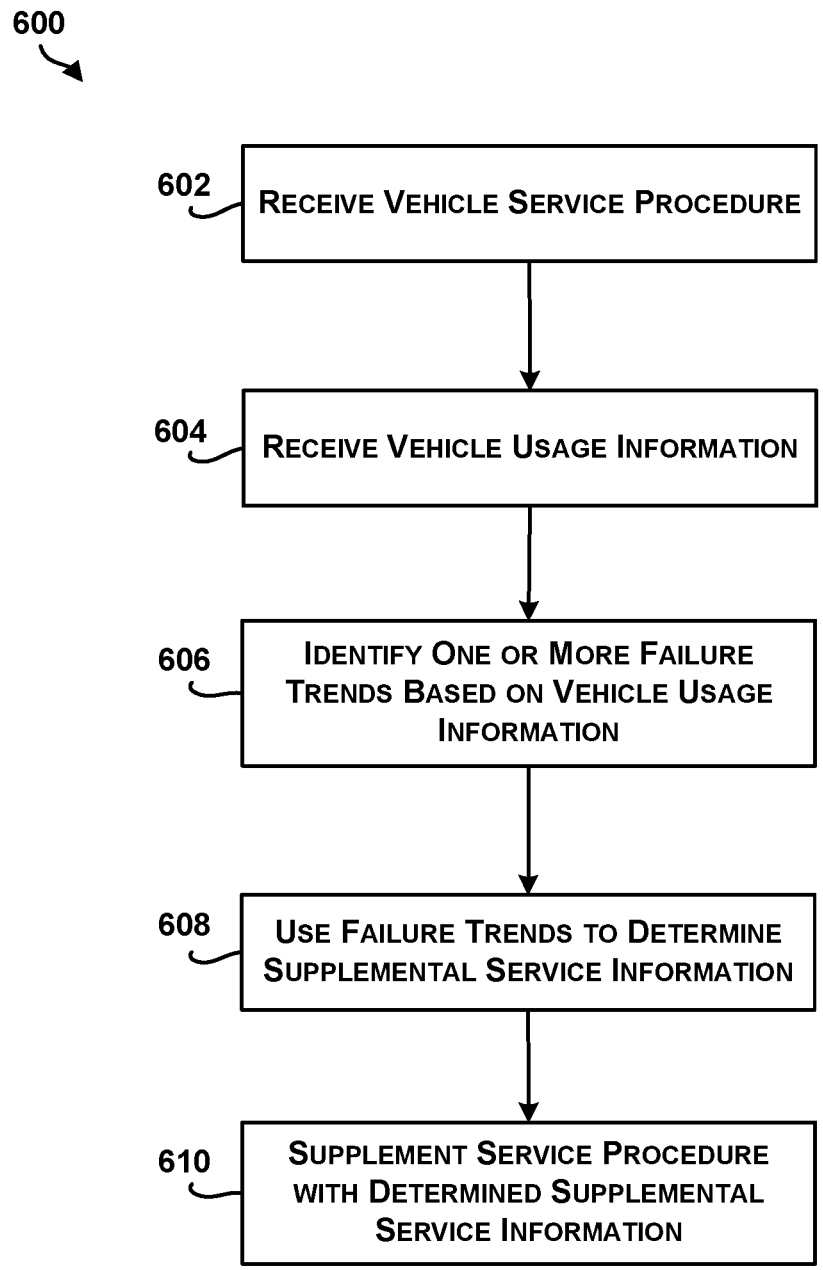
FIG. 6 is a flow chart of an example method for using failure trends to determine supplemental service information, according to an example embodiment.

FIG. 6 is a flow chart of an example method 600 for using vehicle usage information to determine a supplemented service procedure. Method 600 shown in FIG. 6 presents an embodiment of a method that could be used or implemented by the computing device 102 of FIG. 1, for example, or by components of the computing device 102 of FIG. 1, or more generally by any of a variety of computing devices. Method 600 can include one or more operations, functions, or actions as illustrated by one or more of blocks 602-610. Although the blocks are illustrated in a sequential order, these blocks can also be performed in parallel, and/or in a different order than those described herein. Also, the various blocks can be combined into fewer blocks, divided into additional blocks, and/or removed based upon the desired implementation. Each block can represent a module, a segment, or a portion of program code, which includes one or more instructions executable by a processor for implementing specific logical functions or steps in the processor. In addition, each block in FIG. 6 can represent circuitry that is wired to perform specific logical functions in the process.

At block 602, the method 600 includes receiving a vehicle service procedure. The vehicle service procedure may be received by a computing device in a computer-readable format from a data source that includes computer-readable service procedures, and may include a plurality of steps for servicing a vehicle. Additionally, at block 604, the method 600 includes receiving vehicle usage information for a vehicle that is to undergo the received vehicle service procedure. The vehicle usage information may include vehicle mileage, geographical region of use, and possibly other usage information such as what percentage of the vehicle's use took place on expressways.

At block 606, the method 600 further includes identifying one or more failure trends based on the vehicle usage information. More specifically, failure trends may be identified based on past failures of vehicles which share certain attributes that make the vehicles functionally similar to the vehicle being serviced. In some examples, the failure trends may be determined based on past repair orders for related vehicles and/or recommended services that are identified by a manufacturer. For instance, the failure trends can indicate which parts of a particular vehicle type need to be repaired over time, and an average mileage or range of mileage when each part usually needs to be repaired. In further examples, past repair orders for related vehicles may be stored in and retrieved from a database, such as vehicle information database 112 as described in reference to FIG. 1.

To identify relevant failure trends, the computing device may search for repair orders matching the particular vehicle type and performed within a range of miles of the odometer reading of a vehicle. To determine the range of miles, the computing device may subtract a predetermined threshold number of miles from a current vehicle mileage to determine a minimum and add a predetermined threshold number of miles to the current vehicle mileage to determine a maximum. If the odometer reading is 56,123 miles, for example, the range of miles can be 41,123 miles to 71,123 miles. Thus, the computing device can identify repair orders for the particular vehicle type with a reported mileage of between 41,123 miles and 71,123 miles. Alternatively, the computing device may identify which of a plurality of predetermined mileage ranges that the mileage corresponds to. For instance, if the predetermined ranges are 0 to 25,000 miles, 25,000 miles to 50,000 miles, 50,000 to 75,000 miles, and so on at 25,000 mile increments, the computing device may determine that the mileage range is 50,000 to 75,000 miles.

At block 608, the method 600 may further involve using the failure trends to determine supplemental service information for the vehicle. More specifically, warnings for specific vehicle components that may be likely to fail can be added as supplemental information for a technician. The warnings may indicate that the technician should inspect certain components for certain types of predicted failures, or otherwise pay special attention to particular components.

Additionally, for efficiency, this supplemental information may be included for vehicle parts related to a particular service procedure. More specifically, supplemental information may be included for vehicle components proximate to one or more components already involved in the procedure. As an example, the proximate parts may be parts that are of the same system of the vehicle as a particular part being serviced, or the proximate parts may be parts that are connected to the particular part. For instance, the particular part may be a clutch, and the proximate parts may include an axle. If it is determined that axles of the vehicle type tend to leak near or within a threshold amount of the current vehicle mileage, a supplemental warning may be added to inspect the axle for leakage. As another example, the particular part may be a water pump and the proximate parts may include a water hose.

As a further example, a technician may be performing a procedure to replace the brake pads on a car with 89,000 miles. The computing device may determine that similar model vehicles are known to have brake cylinders which tend to leak when the vehicle mileage reaches 115,000 miles. Supplemental information may therefore include a warning to the technician to inspect the brake cylinders while performing the brake pad replacement procedure.

At block 610, the method 600 further includes supplementing the service procedure with the determined supplemental service information. The supplemental service information determined based on usage history may be displayed in various ways. For instance, components with possible impending failures may be listed during related procedural steps. Additional information such as expected types of failure and times to failure may be available to the technician as well. In a further example, an exploded component view of a system (e.g., a component view of a brake system) can be provided which identifies any relevant failure trends affecting any components of the system (e.g., any brake components) while a procedure on the system (e.g., brake pad replacement) is performed.

Figure 7:
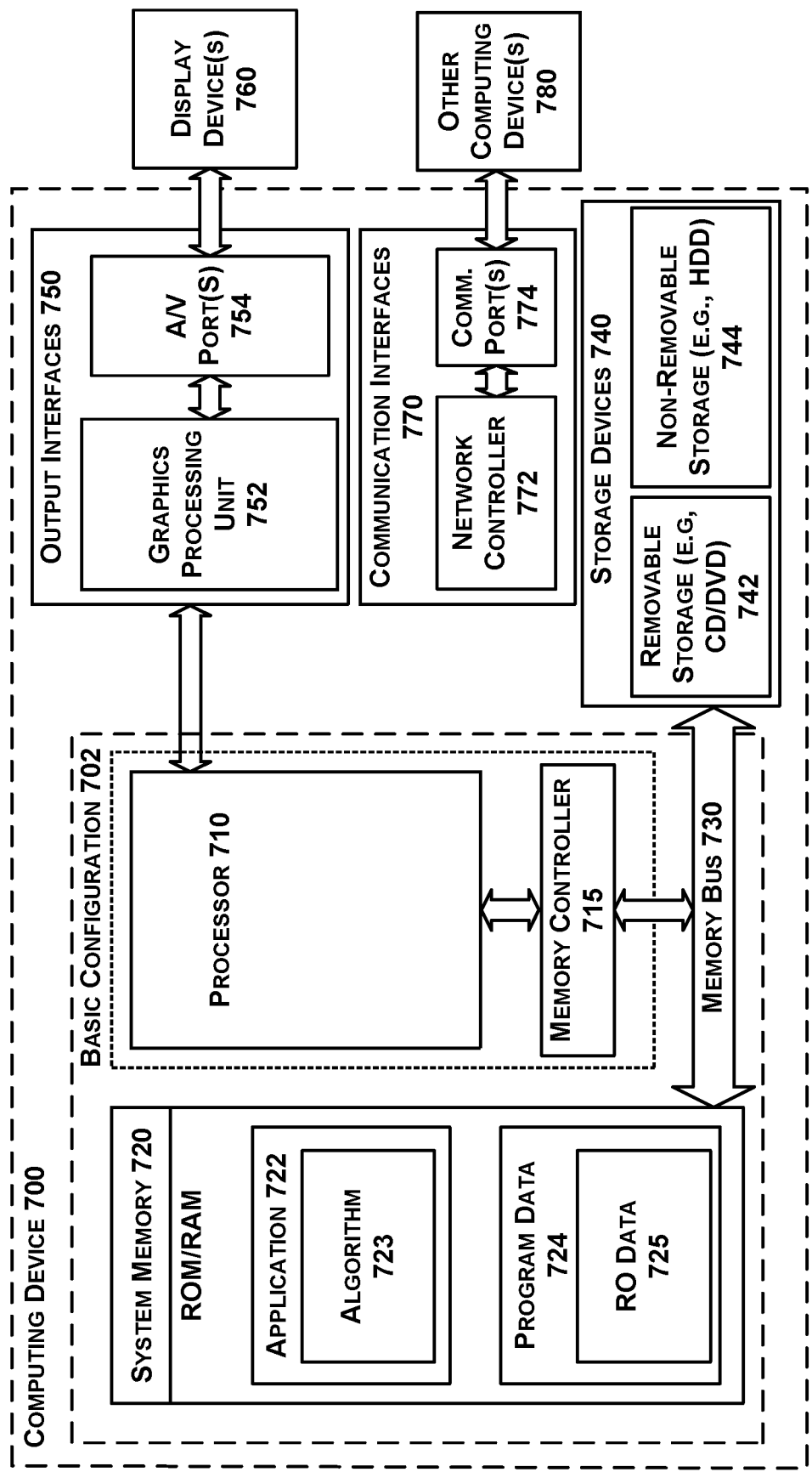
FIG. 7 is a functional block diagram illustrating an example computing device used in a computing system that is arranged in accordance with at least some embodiments described herein.

As described above, the computing devices described herein can be any type of computing device. FIG. 7 is a functional block diagram illustrating an example computing device 700 used in a computing system that is arranged in accordance with at least some embodiments described herein. The computing device 700 can be implemented to determine estimate information or perform any of the functions described above with reference to FIGS. 1-8. In a basic configuration 702, computing device 700 can typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 can include one or more applications 722, and program data 724. Application 722 can include an algorithm 723 that is arranged to receive vehicle information and provide the vehicle information to a communication network or receive vehicle information and determine estimate information, in accordance with the present disclosure. Program data 724 can include repair order data 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that can include a graphics processing unit 752, which can be configured to communicate to various external devices such as display devices 760 or speakers via one or more A/V ports 754 or a communication interface 770. The communication interface 770 can include a network controller 772, which can be arranged to facilitate communications with one or more other computing devices 780 over a network communication via one or more communication ports 774. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer, including both laptop computer and non-laptop computer configurations, or a server.

Figure 8:
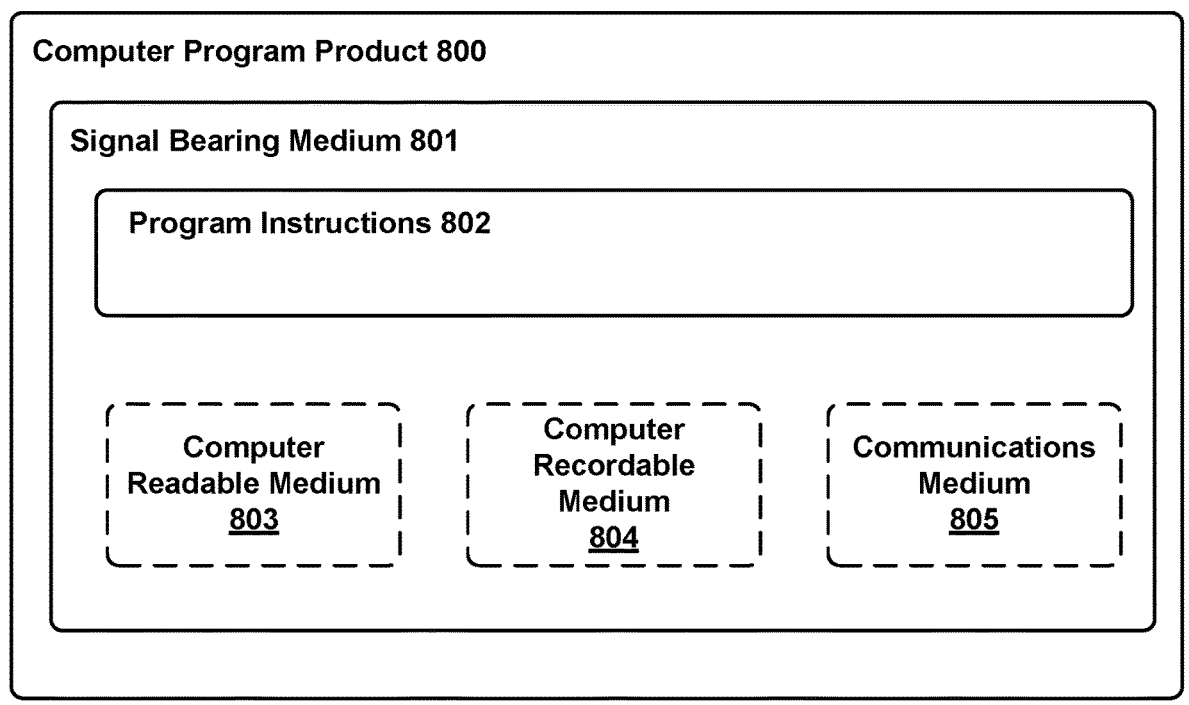
FIG. 8 is a schematic illustrating a conceptual partial view of an example computer program product that includes a computer program for executing a computer process on a computing device, arranged according to at least some embodiments described herein.

In some embodiments, the disclosed methods can be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 801. The signal bearing medium 801 can include one or more programming instructions 802 that, when executed by one or more processors can provide functionality or portions of the functionality described above with respect to FIGS. 1-7. In some examples, the signal beating medium 801 can encompass a computer-readable medium 803, such as, but not limited to, a hard disk drive, a Compact Disc (CD), a Digital Video Disk (DVD), a digital tape, memory, etc. In some implementations, the signal bearing medium 801 can encompass a computer recordable medium 804, such as, but not limited to, memory, read/write (R/W) CDs, R/W DVDs, etc. In some implementations, the signal bearing medium 801 can encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 can be conveyed by a wireless form of the communications medium 805 (e.g., a wireless communications medium conforming to the IEEE 802.11 standard or other transmission protocol).

The one or more programming instructions 802 can be, for example, computer executable and/or logic implemented instructions. In some examples, a computing device such as the computing device 700 of FIG. 7 can be configured to provide various operations, functions, or actions in response to the programming instructions 802 conveyed to the computing device 700 by one or more of the computer-readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, from a first data source that includes computer-readable service procedures, a first service procedure including a plurality of procedural steps for servicing a vehicle;
    identifying a procedural step of the plurality of procedural steps to supplement with supplemental service information;
    receiving, from a second data source that includes computer-readable vehicle information, information about vehicles sharing one or more attributes with the vehicle;
    determining, based on the received information, a piece of supplemental service information to supplement the identified procedural step;
    receiving image data captured by a camera, wherein the captured image data shows the vehicle during performance of the first service procedure;
    detecting, by processing the captured image data showing the vehicle during performance of the first service procedure, an occurrence of a trigger event associated with performance of the identified procedural step of the first service procedure; and
    in response to detecting the occurrence of the trigger event, providing the piece of supplemental service information for presentation on a display during performance of the identified procedural step of the first service procedure.

2. The method of claim 1, wherein the image data comprises video data received from the camera.

3. The method of claim 2, wherein the piece of supplemental service information is overlaid onto the video data as part of an augmented reality (AR) presentation.

4. The method of claim 2, wherein the display is a portable display device which includes the camera.

5. The method of claim 4, wherein the portable display device is a head-mountable device (HMD).

6. The method of claim 1, wherein the trigger event comprises a technician action associated with the identified procedural step of the first service procedure.

7. The method of claim 1, further comprising providing a representation of the identified procedural step for presentation on the display in response to detecting the trigger event.

8. The method of claim 1,
    wherein identifying the procedural step to supplement with supplemental service information comprises identifying a vehicle component involved in the procedural step, and
    wherein the piece of supplemental service information comprises a metric associated with the vehicle component.

9. The method of claim 8, further comprising:
    determining that the procedural step involves application of torque to at least one fastener of the vehicle component, and
    wherein the metric associated with the vehicle component comprises at least one of a torque specification or a torque pattern for the at least one fastener of the vehicle component.

10. The method of claim 1,
wherein the procedural step comprises a direction to add a fluid to one of a vehicle component or a vehicle system, and
wherein the piece of supplemental service information comprises at least one of a fluid capacity and fluid specifications of the one of the vehicle component or the vehicle system.

11. The method of claim 1,
wherein identifying the procedural step to supplement with supplemental service information comprises identifying a vehicle component involved in the procedural step, and
wherein the piece of supplemental service information comprises a location in the vehicle of the vehicle component.

12. The method of claim 1, further comprising:
receiving usage information indicating a usage history of the vehicle; and
determining the piece of supplemental service information based at least in part on the usage information.

13. The method of claim 12, further comprising:
identifying, based on the received usage information, at least one proximate vehicle component for inspection, wherein the at least one proximate vehicle component is proximate to a vehicle component involved in the first service procedure, and
wherein the piece of supplemental service information includes a notification to inspect the at least one proximate vehicle component.

14. The method of claim 13, further comprising:
receiving data indicative of a mileage limit for the at least one proximate vehicle component; and
identifying the at least one proximate vehicle component for inspection based on the received usage information indicating a current vehicle mileage within a threshold amount of the mileage limit for the at least one proximate vehicle component.

15. The method of claim 1, further comprising:
receiving prior service information indicating a prior service history of the vehicle; and
determining the piece of supplemental service information based at least in part on the prior service information.

16. The method of claim 1, further comprising:
receiving at least one signal indicating an availability of at least one vehicle part to be used in performance of the first service procedure, and
wherein the piece of supplemental service information includes an indication of the availability.

17. The method of claim 1, further comprising:
receiving a signal indicating a customer approval of the procedural step, and
wherein the piece of supplemental service information includes an indication of the customer approval of the procedural step.

18. A computing device, comprising:
one or more processors; and
a non-transitory computer-readable data storage device storing computer-readable program instructions, wherein the computer-readable program instructions are executable by the one or more processors to:
receive, from a first data source that includes computer-readable service procedures, a first service procedure including a plurality of procedural steps for servicing a vehicle;
identify a procedural step of the plurality of procedural steps to supplement with supplemental service information;
receive, from a second data source that includes computer-readable vehicle information, information about vehicles sharing one or more attributes with the vehicle;
determine, based on the received information, a piece of supplemental service information to supplement the identified procedural step;
receive image data captured by a camera, wherein the captured image data shows the vehicle during performance of the first service procedure;
detect, by processing the captured image data showing the vehicle during performance of the first service procedure, an occurrence of a trigger event associated with performance of the identified procedural step of the first service procedure; and
in response to detecting the occurrence of the trigger event, provide the piece of supplemental service information for presentation on a display during performance of the identified procedural step of the first service procedure.

19. The computing device of claim 18, wherein the computing device includes the display and the camera, wherein the image data comprises video data received from the camera, and wherein the program instructions are executable by the one or more processors to virtually overlay the piece of supplemental service information onto the video data which is displayed on the display.

20. A non-transitory computer-readable medium having stored therein instructions, that when executed by a computing device, cause the computing device to perform functions comprising:
receiving, from a first data source that includes computer-readable service procedures, a first service procedure including a plurality of procedural steps for servicing a vehicle;
identifying a procedural step of the plurality of procedural steps to supplement with supplemental service information;
receiving, from a second data source that includes computer-readable vehicle information, information about vehicles sharing one or more attributes with the vehicle;
determining, based on the received information, a piece of supplemental service information to supplement the identified procedural step;
receiving image data captured by a camera, wherein the captured image data shows the vehicle during performance of the first service procedure;
detecting, by processing the captured image data showing the vehicle during performance of the first service procedure, an occurrence of a trigger event associated with performance of the identified procedural step of the first service procedure; and
in response to detecting the occurrence of the trigger event, providing the piece of supplemental service information for presentation on a display during performance of the identified procedural step of the first service procedure.

* * * * *